United States Patent
Nagashima

(10) Patent No.: US 9,887,879 B2
(45) Date of Patent: Feb. 6, 2018

(54) MONITORING APPARATUS AND METHOD

(71) Applicant: CANON KABUSHIKI KAISHA, Tokyo (JP)

(72) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 15/019,290

(22) Filed: Feb. 9, 2016

(65) Prior Publication Data

US 2016/0241456 A1 Aug. 18, 2016

(30) Foreign Application Priority Data

Feb. 13, 2015 (JP) .................................. 2015-025990
Feb. 25, 2015 (JP) .................................. 2015-035080

(51) Int. Cl.
*G06F 15/16* (2006.01)
*H04L 12/24* (2006.01)

(52) U.S. Cl.
CPC ........ *H04L 41/0866* (2013.01); *H04L 41/085* (2013.01)

(58) Field of Classification Search
CPC .................. H04L 41/0866; H04L 41/085
See application file for complete search history.

(56) References Cited

U.S. PATENT DOCUMENTS

| | | | |
|---|---|---|---|
| 6,930,985 B1 | 8/2005 | Rathi et al. | |
| 8,078,720 B2 * | 12/2011 | Kawana | H04L 41/00 709/224 |
| 9,292,806 B2 | 3/2016 | Nakazawa | |
| 9,294,980 B2 * | 3/2016 | Jun | H04W 36/22 |
| 2008/0140831 A1 * | 6/2008 | Kawana | H04L 41/00 709/224 |
| 2014/0269275 A1 * | 9/2014 | Jun | H04W 36/22 370/230 |
| 2016/0165510 A1 * | 6/2016 | Jun | H04W 36/22 370/230 |

FOREIGN PATENT DOCUMENTS

| | | |
|---|---|---|
| DE | 602004000100 T2 | 6/2006 |
| JP | 2006318207 A | 11/2006 |

* cited by examiner

*Primary Examiner* — Moustafa M Meky
(74) *Attorney, Agent, or Firm* — Canon U.S.A., Inc. IP Division

(57) ABSTRACT

A management server receives selection of a setting item to be a monitoring target from setting information that can be set for a device, extracts, as monitoring data, setting information corresponding to the selected setting item, generates a monitoring task in which a device to be a monitoring target using the monitoring data, a monitoring setting, and a monitoring schedule are set, and saves the monitoring data corresponding to the monitoring task. Meanwhile, when the setting of a device is monitored using a security policy, not monitoring data but a policy version corresponding to setting information for use in monitoring is selected to generate a monitoring task.

8 Claims, 29 Drawing Sheets

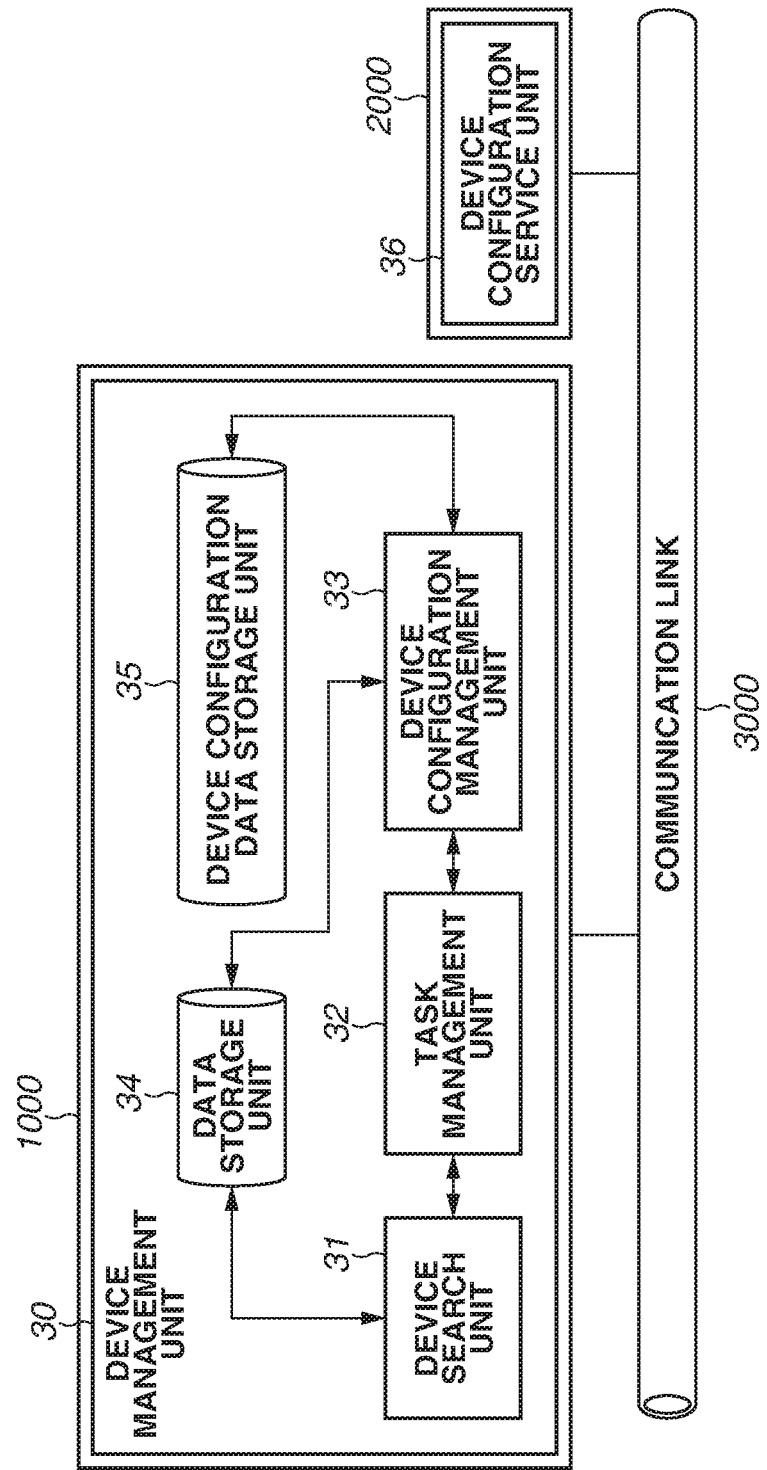

FIG.4A

| DEVICE LIST | | |
|---|---|---|
| DEVICE NAME | PRODUCT NAME | ADDRESS |
| DevA1 | DevA | ipA1 |
| DevA2 | DevA | ipA2 |
| ⋮ | ⋮ | ⋮ |
| DevAx | DevA | ipAx |
| DevB1 | DevB | ipB1 |
| DevB2 | DevB | ipB2 |
| ⋮ | ⋮ | ⋮ |
| DevBx | DevB | ipBx |

FIG.4B

| DEVICE LIST | | | | |
|---|---|---|---|---|
| DEVICE NAME | PRODUCT NAME | ADDRESS | DEVICE TYPE | CONFIGURATION DATA TYPE |
| DevA1 | DevA | ipA1 | SUPPORTING DATA TYPE 1 | 1, 2, 3 |
| DevA2 | DevA | ipA2 | SUPPORTING DATA TYPE 1 | 1, 2, 3 |
| ⋮ | ⋮ | ⋮ | ⋮ | ⋮ |
| DevAx | DevA | ipAx | SUPPORTING DATA TYPE 1 | 1, 2, 3 |
| DevB1 | DevB | ipB1 | NOT SUPPORTING DATA TYPE 1 | 2, 3 |
| DevB2 | DevB | ipB2 | NOT SUPPORTING DATA TYPE 1 | 2, 3 |
| ⋮ | ⋮ | ⋮ | ⋮ | ⋮ |
| DevBx | DevB | ipBx | NOT SUPPORTING DATA TYPE 1 | 2, 3 |

FIG.5

| CONTENT OF DEVICE CONFIGURATION | | | |
|---|---|---|---|
| FILE NAME | SETTING ITEM 1 | SETTING ITEM 2 | SETTING VALUE |
| DEVICE CONFIGURATION 1 | TIMER | TIME FOR TRANSITION TO AUTO SLEEP | 10 MINUTES |
| ⋮ | ⋮ | TIME FOR TRANSITION TO AUTO SHUTDOWN | 5 HOURS |
| ⋮ | ⋮ | ⋮ | ⋮ |
| ⋮ | NETWORK | LPR PORT USABILITY | UNUSABLE |
| ⋮ | ⋮ | LPR PORT NUMBER | 9100 |
| ⋮ | ⋮ | SNMP PORT NUMBER | 161; 162 |
| DEVICE CONFIGURATION 2 | TIMER | TIME FOR TRANSITION TO AUTO SLEEP | 5 MINUTES |
| ⋮ | ⋮ | ⋮ | ⋮ |
| ⋮ | ⋮ | TIME FOR TRANSITION TO AUTO SHUTDOWN | 10 HOURS |
| DEVICE CONFIGURATION x | TIMER | TIME FOR TRANSITION TO AUTO SLEEP | 15 MINUTES |
| ⋮ | ⋮ | ⋮ | ⋮ |
| ⋮ | NETWORK | LPR PORT NUMBER | 9100 |

FIG.6

| DEVICE CONFIGURATION FILE ACQUISITION/SETTING LIST | | |
|---|---|---|
| FILE NAME | ACQUISITION SOURCE DEVICE NAME | SETTING DESTINATION DEVICE NAME |
| DEVICE CONFIGURATION 1 | DevA1 | DevA2~DevAx, DevB1~DevBx |
| DEVICE CONFIGURATION 2 | DevA2 | |
| ⋮ | ⋮ | |
| DEVICE CONFIGURATION x | DevAx | |

FIG.8

| | CREATION OF CONFIGURATION INFORMATION MONITORING TASK | | |
|---|---|---|---|
| | STEP 1: SELECTION OF DEVICE MONITORING ITEM | | |
| | | NEXT | CANCEL |

SELECTION OF DEVICE CONFIGURATION FILE

DEVICE CONFIGURATION FILE: DEVICE CONFIGURATION 1

SELECTION OF DEVICE MONITORING ITEM

| | MONITORING ITEM CANDIDATE | | MONITORING VALUE |
|---|---|---|---|
| ☑ | TIMER | TIME FOR TRANSITION TO AUTO SLEEP | 10 MINUTES |
| | ⋮ | TIME FOR TRANSITION TO AUTO SHUTDOWN | 5 HOURS |
| | ⋮ | ⋮ | ⋮ |
| ☑ | NETWORK | LPR PORT NUMBER | 9100 |
| | ⋮ | SNMP PORT NUMBER | 161; 162 |

FIG.9

| | CREATION OF CONFIGURATION INFORMATION MONITORING TASK | | |
|---|---|---|---|

STEP 2: SELECTION OF DEVICE MONITORING ITEM

[ NEXT ] [ CANCEL ]

SELECTION OF MONITORING TARGET DEVICE

| | DEVICE NAME | PRODUCT NAME | ADDRESS |
|---|---|---|---|
| ☑ | DevA1 | DevA | ipA1 |
| ☑ | DevA2 | DevA | ipA2 |
| | ⋮ | ⋮ | ⋮ |
| ☑ | DevAx | DevA | ipAx |
| ☑ | DevB1 | DevB | ipB1 |
| ☑ | DevB2 | DevB | ipB2 |
| | ⋮ | ⋮ | ⋮ |
| ☑ | DevBx | DevB | ipBx |

FIG.10

CREATION OF CONFIGURATION INFORMATION MONITORING TASK

STEP 3: SETTING OF MONITORING METHOD

[NEXT] [CANCEL]

SETTING OF MONITORING METHOD

OPERATION WHEN
CHANGE IS DETECTED:
- ⦿ FORCED RESTORATION + EMAIL NOTIFICATION
- ○ FORCED RESTORATION
- ○ EMAIL NOTIFICATION

FIG.11A

CREATION OF CONFIGURATION INFORMATION MONITORING TASK

STEP 4: TASK REGISTRATION SETTINGS

[ NEXT ] [ CANCEL ]

TASK NAME

| TASK NAME: | SETTING MONITORING TASK |

SCHEDULE SETTINGS

| EXECUTION SCHEDULE: | PERIODICALLY EXECUTE ▾ |
| --- | --- |
| EXECUTION CYCLE: | DAILY ▾ |
| | TIME OF START OF EXECUTION — 12:00 |

NOTIFICATION OF MONITORING RESULT

| NOTIFICATION DESTINATION EMAIL ADDRESS: | admin@xxx.yy.zz |
| --- | --- |
| NOTIFICATION TIMING: | ◉ NOTIFICATION ONLY WHEN CHANGE IS DETECTED |
| | ○ NOTIFICATION EVERY TIME TASK IS EXECUTED |

FIG.11B

CREATION OF CONFIGURATION INFORMATION MONITORING TASK

STEP 4: TASK REGISTRATION SETTINGS

[NEXT] [CANCEL]

TASK NAME

| TASK NAME: | SETTING MONITORING TASK |

SCHEDULE SETTINGS

| EXECUTION SCHEDULE: | PERIODICALLY EXECUTE |
|---|---|
| EXECUTION CYCLE: | DAILY |
| | TIME OF START OF EXECUTION — 12:00 |

NOTIFICATION OF EXECUTION RESULT

☑ EMAIL NOTIFICATION

| NOTIFICATION DESTINATION EMAIL ADDRESS: | admin@xxx.yy.zz |

FIG.12

CREATION OF CONFIGURATION INFORMATION MONITORING TASK

STEP 5: CONFIRMATION OF REGISTRATION CONTENTS

TASK NAME        [REGISTER]  [CANCEL]

| TASK NAME: | SETTING MONITORING TASK |
|---|---|

SCHEDULE SETTINGS

| EXECUTION SCHEDULE: | PERIODICALLY EXECUTE | |
|---|---|---|
| EXECUTION CYCLE: | DAILY | |
| | TIME OF START OF EXECUTION | 12:00 |

NOTIFICATION OF MONITORING RESULT

| NOTIFICATION DESTINATION EMAIL ADDRESS: | admin@xxx.yy.zz |
|---|---|
| NOTIFICATION TIMING: | NOTIFICATION ONLY WHEN CHANGE IS DETECTED |

MONITORING METHOD

| FORCED RESTORATION + EMAIL NOTIFICATION |
|---|

MONITORING TARGET DEVICE

| DevA1, DevA2 ··· DevAx, DevB1, DevB2 ··· DevBx |
|---|

MONITORING INFORMATION

| MONITORING ITEM | MONITORING VALUE |
|---|---|
| TIME FOR TRANSITION TO AUTO SLEEP | 10 MINUTES LATER |
| LPR PORT NUMBER | 9100 |

DEVICE CONFIGURATION FILE

| DEVICE CONFIGURATION 1 |
|---|

FIG.17

| DATA CONFIGURATION | CONFIGURATION DATA TYPE | MONITORING TARGET DATA TYPE | |
|---|---|---|---|
| | | DEVICE SUPPORTING DATA TYPE 1 | DEVICE NOT SUPPORTING DATA TYPE 1 |
| 1 | DATA TYPE 1<br>DATA TYPE 2<br>DATA TYPE 3 | DATA TYPE 2A<br>DATA TYPE 3 | DATA TYPE 2<br>DATA TYPE 3 |
| 2 | DATA TYPE 1<br>DATA TYPE 2 | DATA TYPE 2A | DATA TYPE 2 |
| 3 | DATA TYPE 2<br>DATA TYPE 3 | DATA TYPE 2<br>DATA TYPE 3 | DATA TYPE 2<br>DATA TYPE 3 |
| 4 | DATA TYPE 1<br>DATA TYPE 3 | DATA TYPE 3 | DATA TYPE 3 |
| 5 | DATA TYPE 1 | NO MONITORING TARGET | NO MONITORING TARGET |
| 6 | DATA TYPE 2 | DATA TYPE 2 | DATA TYPE 2 |
| 7 | DATA TYPE 3 | DATA TYPE 3 | DATA TYPE 3 |

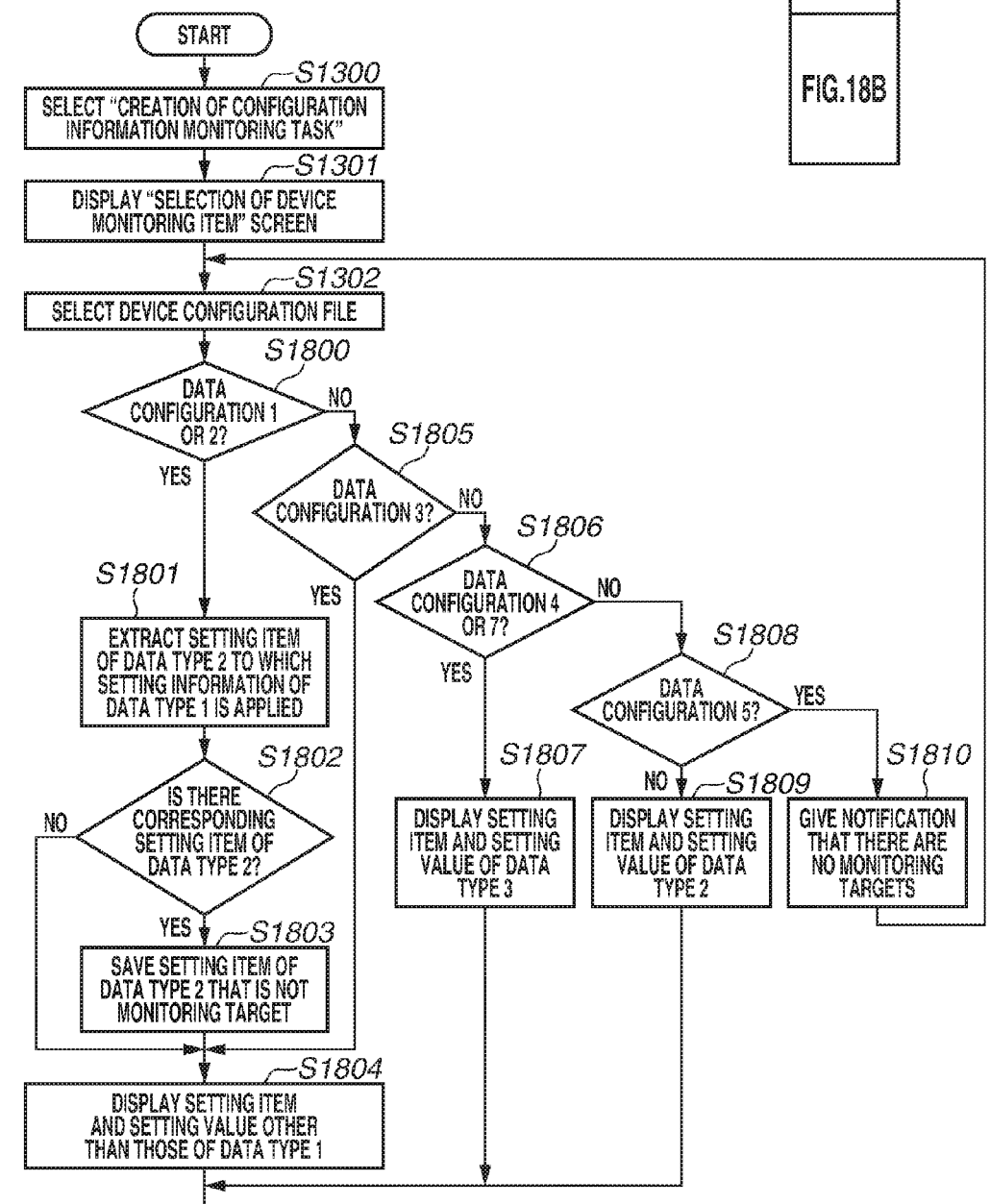

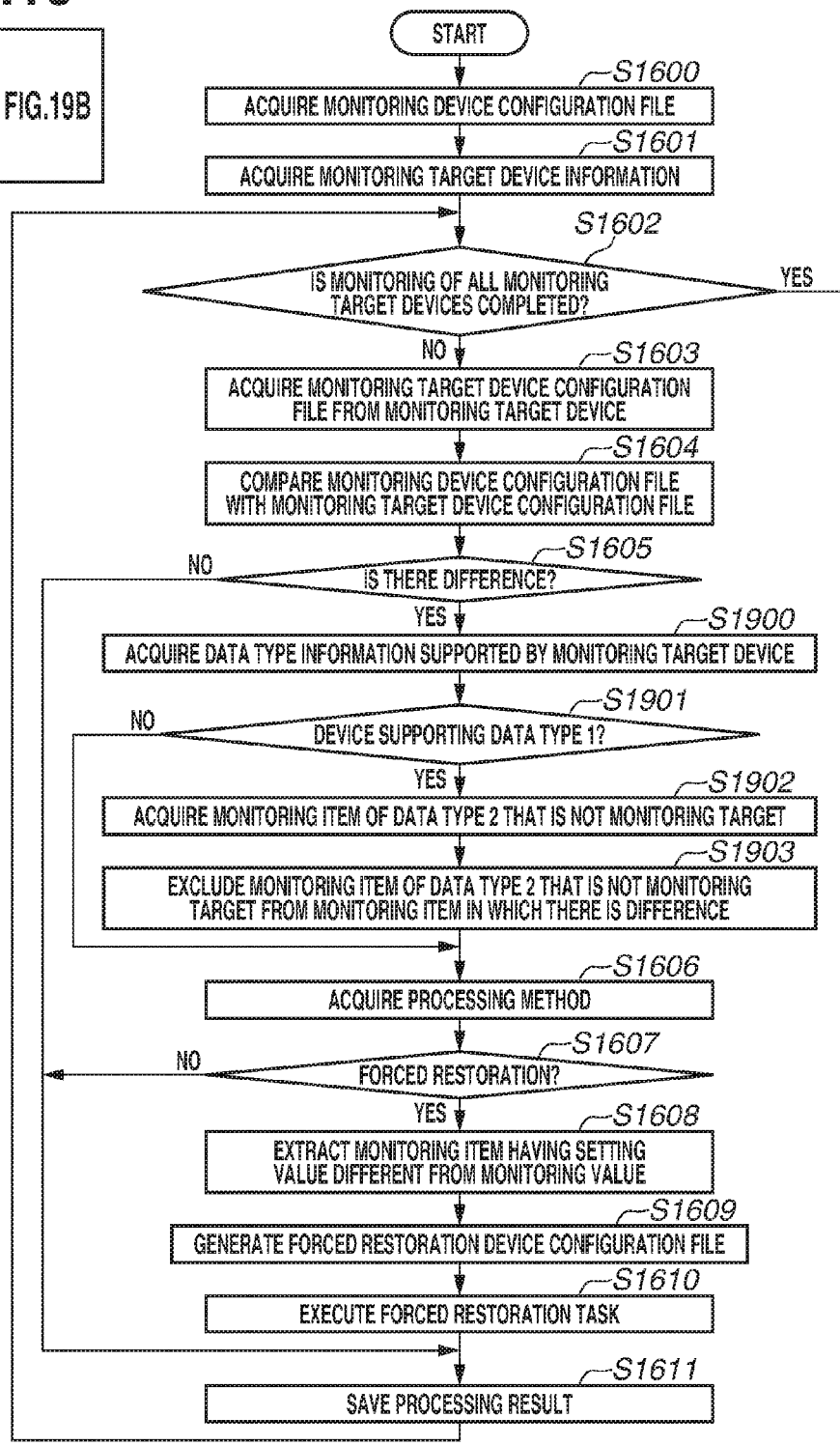

FIG.20

| ROUNDING PROCESS DEVICE LIST | | | | |
|---|---|---|---|---|
| FILE NAME | SETTING ITEM 1 | SETTING ITEM 2 | ROUNDING PROCESS DEVICE NAME | ROUNDING PROCESS RESULT |
| DEVICE CONFIGURATION 1 | TIMER/ POWER DEVICE | TIME OF START OF SUMMER TIME | | |
| ... | ... | TIME FOR TRANSITION TO AUTO SLEEP | DevB1 | 15 MINUTES |
| ... | ... | ... | ... | ... |
| ... | NETWORK | LPR PORT USABILITY | DevBx | 16 MINUTES |
| ... | ... | LPR PORT NUMBER | | |
| ... | ... | SNMP PORT NUMBER | | |

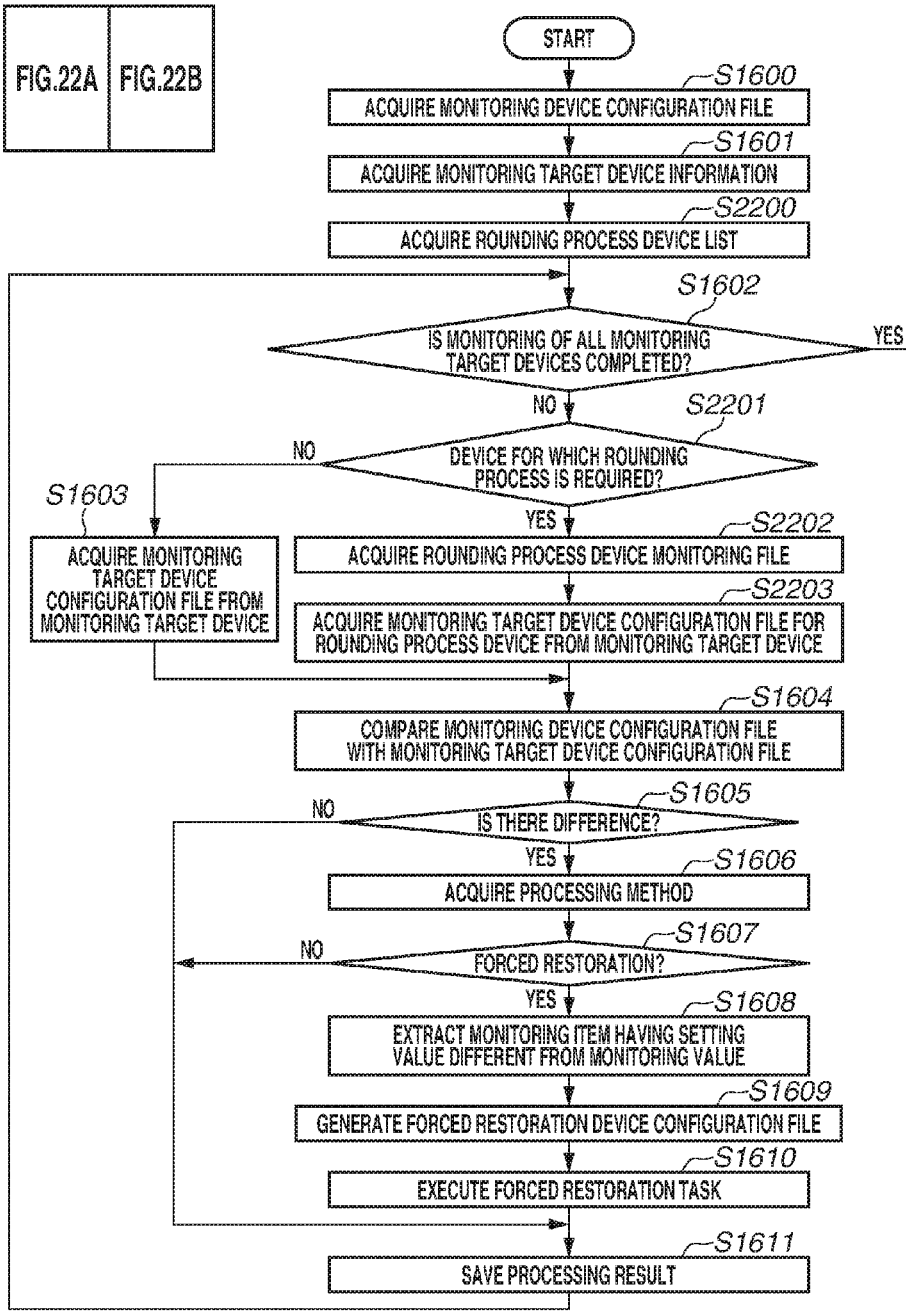

MONITORING APPARATUS AND METHOD

BACKGROUND OF THE INVENTION

Field of the Invention

The present invention relates to a technique for remote monitoring control of setting information of a network device.

Description of the Related Art

To achieve the stable operation of a plurality of devices (e.g., image forming apparatuses) connected to a network of an office, an information technology (IT) administrator remotely monitors the devices regarding whether setting information of each device is changed or altered to an unintended setting value.

Conventionally, Japanese Patent Application Laid-Open No. 2006-318207 is discussed as a technique in which a management server monitors setting information. In Japanese Patent Application Laid-Open No. 2006-318207, setting information stored in a database of a management server and setting information acquired from a plurality of devices as monitoring targets are compared with each other. In a case where these pieces of setting information are different from each other, the settings of the devices are updated using the setting information stored in the management server, thereby achieving the stable operation of the devices.

However, there are cases where there is a setting item that does not need to be monitored depending on the device, and where even for the same setting item, a value that can be set differs depending on the device. In such cases, it is not possible to perform appropriate monitoring with the above conventional technique. To achieve such monitoring using the technique of Japanese Patent Application Laid-Open No. 2006-318207, it is necessary to create a plurality of databases on the management server according to the characteristics of the devices as monitoring targets. Further, every time monitoring is set, it is necessary to specify a database for use according to the characteristics of the devices as monitoring targets. Particularly, in a large-scale device management system, the trouble and the cost of such monitoring become enormous.

As described above, in a conventional remote monitoring technique for configuration information of a device, it is difficult to achieve appropriate monitoring taking into account the operability of a monitoring procedure and device characteristics, and there is a problem with the management cost of a computer system to an IT administrator.

SUMMARY OF THE INVENTION

The present invention is directed to providing a mechanism capable of achieving an improvement in the operability of a monitoring procedure for setting information of a network device and appropriate remote monitoring according to network device characteristics, and reducing the management cost, of an IT administrator, relating to a computer system.

According to an aspect of the present invention, a monitoring apparatus includes a selection unit configured to select, in a case where a monitoring task for monitoring setting information set for a network device is generated, a setting content to be a monitoring target from setting information that can be set for the network device, a saving unit configured to extract, as monitoring data, in a case where setting information of a specific type is selected as the setting content, setting information corresponding to the setting content along with generation of a monitoring task in which a network device as a target to be monitored, a monitoring setting, and a monitoring schedule are set, and save the monitoring data in such a manner that the monitoring data is associated with the generated monitoring task, a control unit configured to control execution of the generated monitoring task according to the monitoring schedule set in the monitoring task, an acquisition unit configured to acquire, in a case where the monitoring task is executed, setting information corresponding to the monitoring data from the network device set in the monitoring task, and an execution unit configured to execute, according to a result of a comparison process using the setting information acquired by the acquisition unit, processing according to the monitoring setting set in the executed monitoring task, wherein in a case where setting information of a type different from the specific type is selected as the setting content, the saving unit does not save monitoring data along with generation of a monitoring task in which a network device as a target to be monitored, a monitoring setting, and a monitoring schedule are set.

Further features of the present invention will become apparent from the following description of exemplary embodiments with reference to the attached drawings.

BRIEF DESCRIPTION OF THE DRAWINGS

FIG. 3 is a diagram illustrating a software configuration of the management server.

FIGS. 4A and 4B are diagrams illustrating examples of device lists.

FIG. 5 is a diagram illustrating an example of expansion of a device configuration file.

FIG. 6 is a diagram illustrating an example of a device configuration file acquisition/setting list.

FIG. 8 is a diagram illustrating an example of a "selection of device monitoring item" screen.

FIG. 9 is a diagram illustrating an example of a "selection of monitoring target device" screen.

FIG. 10 is a diagram illustrating an example of a "setting of monitoring method" screen.

FIGS. 11A and 11B are diagrams illustrating examples of "task registration settings" screens.

FIG. 12 is a diagram illustrating an example of a "task registration settings" screen.

FIG. 17 is a diagram illustrating an example of a monitoring target data type according to the ability of a device based on a data configuration applied to a second exemplary embodiment.

FIG. 20 is a diagram illustrating a rounding process device list applied to a third exemplary embodiment.

DESCRIPTION OF THE EMBODIMENTS

Exemplary embodiments for implementing the present invention will be described below with reference to the drawings. The following exemplary embodiments do not limit the invention according to the appended claims, and not all the combinations of the features described in the exemplary embodiments are essential for a method for solving the issues addressed by the invention.

Figure 1:
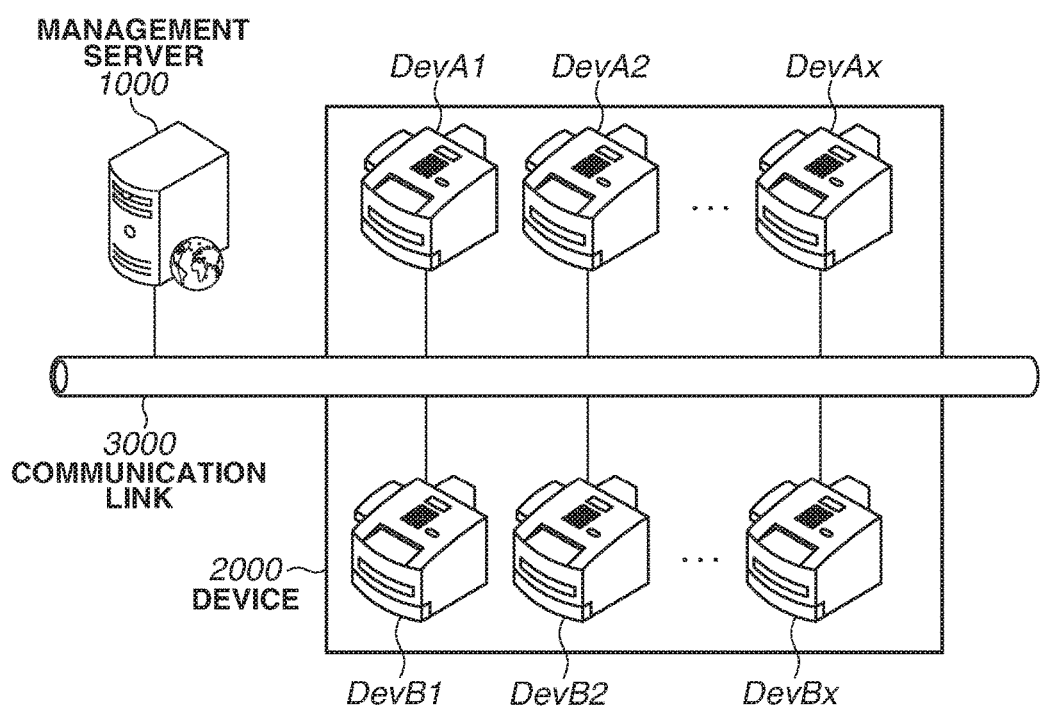
FIG. 1 is a diagram illustrating a network configuration of a device management system including a monitoring apparatus according to the present invention.

FIG. 1 is a diagram illustrating an example of the network configuration of a device management system including a monitoring apparatus according to an exemplary embodiment of the present invention.

As illustrated in FIG. 1, the device management system according to the present exemplary embodiment includes a management server 1000 and devices 2000 (DevA1 to DevAx and DevB1 to DevBx). In a large-scale device management system, the number of network devices can be several hundreds to several tens of thousands. The management server 1000 and the devices 2000 are connected to each other via a communication link 3000. The management server 1000 is a server, for managing the devices 2000, operated by a device management unit 30 illustrated in FIG. 3, and corresponds to the monitoring apparatus according to the present invention.

Each device 2000 is, for example, a network device, such as an image forming apparatus (a printer, a scanner, a facsimile, a multifunction peripheral, or the like), an information processing apparatus (a personal computer, a tablet terminal, a smartphone, or the like), a network camera, a digital medical device, a robot, an in-car terminal, an air-conditioning device, or another network household electrical appliance. The devices 2000 are not limited to the above exemplified network devices, and may be other network devices.

Figure 2:
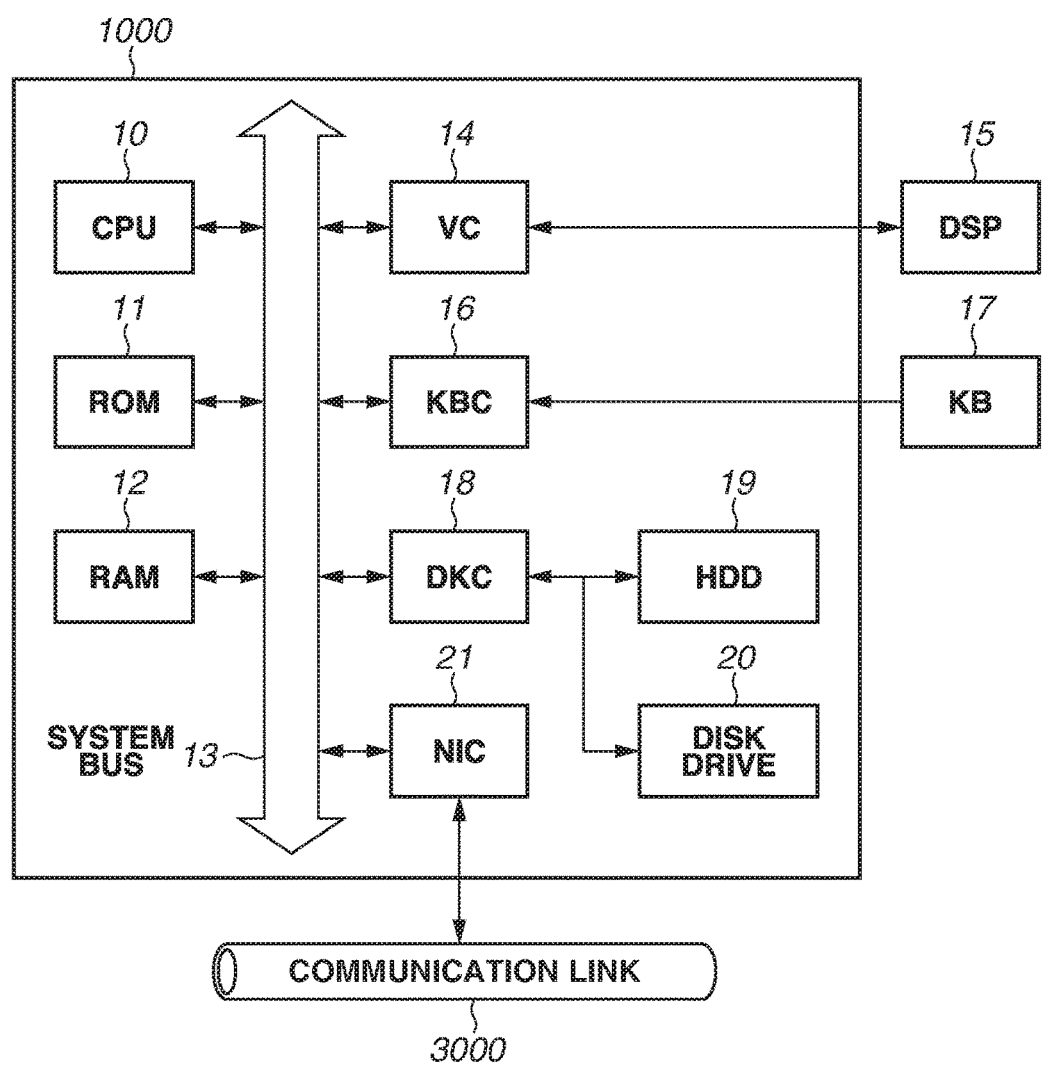
FIG. 2 is a diagram illustrating a hardware configuration of a management server.

FIG. 2 is a diagram illustrating an example of the hardware configuration of the management server 1000.

In FIG. 2, a central processing unit (CPU) 10 executes a program stored in a read-only memory (ROM) 11 or a hard disk drive (HDD) 19, using a random-access memory (RAM) 12 as a work area, thereby achieving each function of the device management unit 30 illustrated in FIG. 3 via a system bus 13. The program to be executed by the CPU 10 may be supplied from a storage medium, such as a flexible disk (FD), a Compact Disc Read-Only Memory (CD-ROM), a digital versatile disc (DVD), a magnetic tape, or an integrated circuit (IC) memory card, which can be mounted on a disk drive 20.

The CPU 10 displays a user interface (UI) on a display device (DSP; display) 15 via a video card (VC) 14. Further, the CPU 10 performs control, via a keyboard controller (KBC) 16, according to an instruction input to the user interface from a keyboard (KB) 17 or a pointing device such as a mouse. Further, the CPU 10 communicates data to and from the devices 2000 on the communication link 3000 via a network interface card (NIC) 21.

FIG. 3 is a diagram illustrating an example of software configuration of the device management unit 30, which operates on the management server 1000, and a device configuration service unit 36, which operates on each device 2000.

The device management unit 30 illustrated in FIG. 3 is achieved in such a manner that the CPU 10 of the management server 1000 loads a program stored in, for example, the HDD 19 into the RAM 12 as necessary and executes the program.

The device configuration service unit 36 is achieved in such a manner that a CPU (not illustrated) of the device 2000 loads a program stored in a recording device, such as a ROM, an HDD, or the like into a RAM or the like as necessary and executes the program.

The device management unit 30 includes a device search unit 31, a task management unit 32, a device configuration management unit 33, a data storage unit 34, and a device configuration data storage unit 35. Further, the device management unit 30 can be implemented as a web-based application. In this case, the device management unit 30 can be used via a web browser. In the case of the configuration in which the device management unit 30 is implemented as a web-based application, the device management unit 30 performs control so that, for example, screens illustrated in FIGS. 7 to 12 are displayed on a web browser.

The task management unit 32 has the function of managing a task which is generated by the device search unit 31 or the device configuration management unit 33 and stored in the data storage unit 34. According to a schedule set for the task, the task management unit 32 instructs the device search unit 31 or the device configuration management unit 33 having stored the task to execute the task.

Examples of the task of the device search unit 31 include a device search function for searching for the devices 2000 using Simple Network Management Protocol (SNMP) or Internet Protocol (IP) broadcast or Service Location Protocol (SLP) multicast, which is known to a person skilled in the art. The device search unit 31 searches for the devices 2000 at any timing. Then, the device search unit 31 has the function of acquiring and changing device information, such as a management information base (MIB), via the communication link 3000, such as a local area network (LAN).

In the present exemplary embodiment, as a result of a device search, the device search unit 31 acquires device information, such as a device name, a product name, and an address, and saves the device information in the data storage unit 34. The data storage unit 34 is a data recording medium, such as a database operating on the HDD 19, and saves table data, such as a device list.

FIG. 4A is a diagram illustrating an example of device information acquired by a device search performed by the device search unit 31 according to a first exemplary embodiment.

As illustrated in FIG. 4A, the device information as a result of the device search includes device information, such as a device name, a product name, and an address.

For example, it is indicated that a device 2000 named DevA1 (hereinafter referred to as a "device DevA1") is a device having the product name of "DevA" and the address of "ipA1". The same applies to devices DevA2 to DevAx and devices DevB1 to DevBx.

The device information may be acquired by importing a file, such as a comma-separated values (CSV) file, instead of the device search performed by the device search unit 31.

The description returns to FIG. 3 below.

The device configuration management unit 33 has an acquisition function for acquiring configuration information of the devices 2000, a setting function for setting configuration information of the devices 2000, and a monitoring function for monitoring configuration information of the devices 2000. The configuration information of the devices 2000 refers to information including various setting items described below in the devices 2000 and the setting values of the setting items. The device configuration management unit 33 communicates with the device configuration service unit 36 of each device 2000 by a web service using a protocol, such as so-called Simple Object Access Protocol (SOAP).

Setting information according to the present invention includes a security policy. The security policy defines who is permitted to perform which operation, and how to strengthen the confidentiality of a password, in order to prevent the unintended use of information, entry from outside, and the leakage of secrets.

For example, the security policy of the devices 2000 includes the usability of a raw port as the use policy of a port, and the period of validity and the setting of complexity of a password as the setting policy of a password.

A description is given below of the acquisition function for acquiring configuration information, the setting function for setting configuration information, and the monitoring function for monitoring configuration information by the device configuration management unit 33.

First, the acquisition function of the device configuration management unit 33 is the function for acquiring configuration information from the device configuration service unit 36 of each device 2000 and saving the configuration information in the device configuration data storage unit 35. The device configuration data storage unit 35 is a File Transfer Protocol (FTP) server or a Hypertext Transfer Protocol (HTTP) server, which operates on the HDD 19, or a file server, which can save a file, such as a device configuration file. In the present exemplary embodiment, it is assumed that the device configuration management unit 33 acquires configuration information of the devices 2000 in a file format termed a device configuration file.

FIG. 5 is a diagram illustrating an example of the expansion of the device configuration file.

As illustrated in FIG. 5, the device configuration file includes information, such as a file name, a setting item 1, a setting item 2, and a setting value.

For example, a device configuration file named "device configuration 1" includes "timer" and "network" as setting items 1. "Timer" as one of the setting items 1 includes "time for transition to auto sleep" and "time for transition to auto shutdown" as setting items 2 under "timer". Further, in the example of FIG. 5, the setting value of "time for transition to auto sleep" as one of the setting items 2 is set to "10 minutes", and the setting value of "time for transition to auto shutdown" as the other of the setting items 2 is set to "5 hours".

Similarly, "network" as the other of the setting items 1 includes "LPR port usability", "LPR port number", and "SNMP port number" as setting items 2 under "network". In the example of FIG. 5, the setting value of "LPR port usability" is set to "unusable", the setting value of "LPR port number" is set to "9100", and the setting value of "SNMP port number" is set to "161" and "162".

The same applies to device configuration files named "device configuration 2" and "device configuration x".

As described above, the device configuration file illustrated in FIG. 5 includes setting information that can be set for the devices 2000. The device configuration file can be set for the devices 2000 by the setting function of the device configuration management unit 33.

Next, the setting function of the device configuration management unit 33 is described.

The setting function of the device configuration management unit 33 is the function for setting a device configuration file saved in the device configuration data storage unit 35 to the devices 2000.

Further, by the setting function of the device configuration management unit 33, a distribution task for achieving the setting of a device configuration file for the devices 2000 can be created. Specifically, first, in the setting function of the device configuration management unit 33, a device configuration file is selected and setting information included in the device configuration file is selected. Then, a distribution target device is selected from among candidates determined according to the selected content. In this process, depending on the selected setting item, devices capable of handling the setting of the selected setting item are narrowed down. Then, only a device capable of handling the selected setting item can be determined as a candidate for the distribution target device. After selecting a device, the execution schedule of a task is set and a distribution task is generated. The execution of this distribution task enables that desired setting information is distributed from the management server 1000 to a device on a network and the setting is set to the device. Further, the execution result of the distribution task executed by the task management unit 32 is saved in the data storage unit 34.

FIG. 6 is a diagram illustrating an example of a device configuration file acquisition/setting list.

As illustrated in FIG. 6, the device configuration file acquisition/setting list includes a file name, an acquisition source device name, and a setting destination device name.

In the example of FIG. 6, it is indicated that a device configuration file named "device configuration 1" is acquired from the device DevA1 and is set for the devices DevA2 to DevAx and DevB1 to DevBx.

Meanwhile, it is indicated that device configuration files named "device configuration 2" to "device configuration x" are device configuration files acquired from the devices DevA2 to DevAx, respectively, but are not set for other devices 2000.

As described above, the device configuration management unit 33 can set the same value to a plurality of devices 2000, for each of various setting items forming configuration information, using the acquisition function for acquiring configuration information and the setting function for setting configuration information.

However, there is a possibility that configuration information set for the devices 2000 by the device configuration management unit 33 is changed or altered through a local UI or a remote UI of each device 2000 against the intention of an IT administrator, or by a malicious third person. Thus, in the device management system where the management server 1000 manages the devices 2000, the device configuration management unit 33 needs to appropriately monitor whether configuration information of the devices 2000 is altered or changed. The monitoring function of the device configuration management unit 33 in the present exemplary embodiment is the function for monitoring configuration information set for the devices 2000 as described above.

Next, with reference to FIGS. 4A and 5 to 17, a detailed description is given of appropriate monitoring for configuration information of the devices 2000 by the device configuration management unit 33.

First, a device management application including the device management unit 30 is described.

Figure 7:
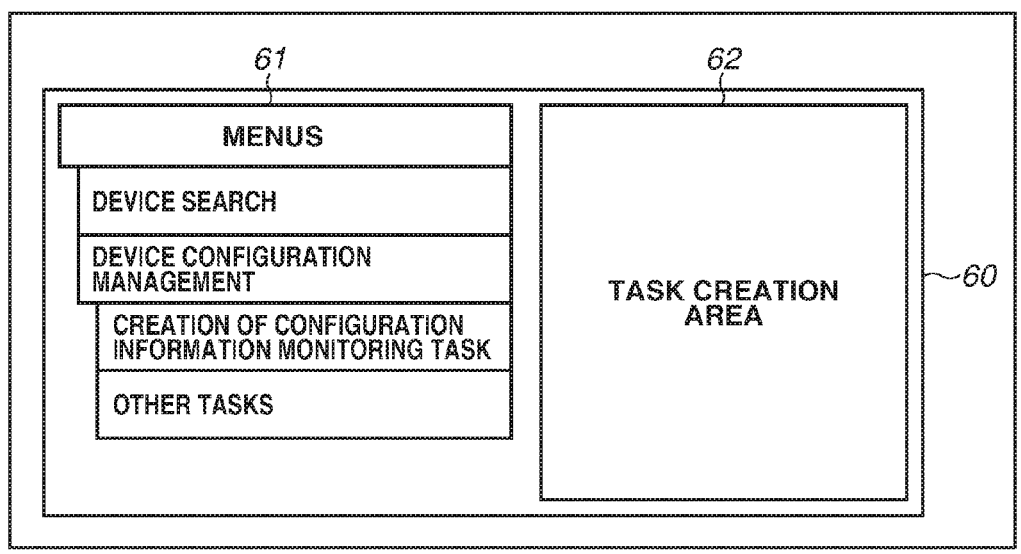
FIG. 7 is a diagram illustrating an example of a screen of a device management application.

FIG. 7 is a diagram illustrating an example of a screen of the device management application.

A screen of a device management application 60 as illustrated in FIG. 7 is displayed on the DSP 15 by the device management unit 30. As illustrated in FIG. 7, the screen of the device management application 60 includes menus 61 and a task creation area 62. According to a selected one of the menus 61, the device management unit 30 displays a screen for creating a task in the task creation area 62 of the DSP 15.

The menus 61 include a "device search" menu provided by the device search unit 31 and a "device configuration management" menu provided by the device configuration management unit 33.

The "device search" menu is a menu for the device search unit 31 to execute a task of searching for the devices 2000. An example of the result of the device search is the device list illustrated in FIG. 4A.

Further, the "device configuration management" menu includes "creation of configuration information monitoring task" and "other tasks" menus.

The "creation of configuration information monitoring task" menu is a menu for monitoring configuration information of the devices 2000 by the device configuration management unit 33.

The "other tasks" menu is a menu for acquiring and setting configuration information for the devices 2000. An example of the result of acquiring and setting device configuration information is the device configuration file acquisition/setting list illustrated in FIG. 6.

Figure 13:
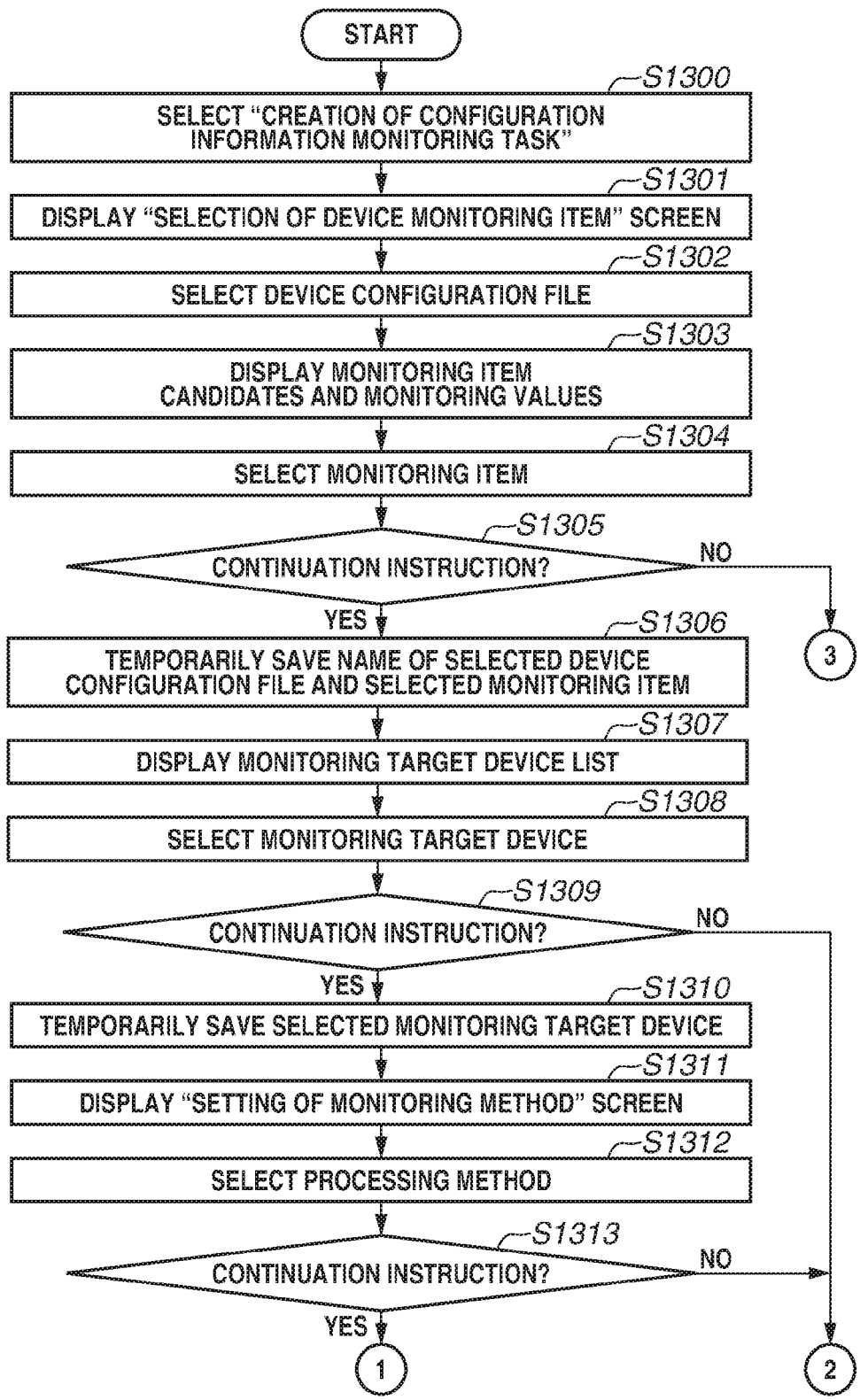
FIG. 13 is a flowchart illustrating an example of a configuration information monitoring task creation process according to a first exemplary embodiment.
Figure 14:
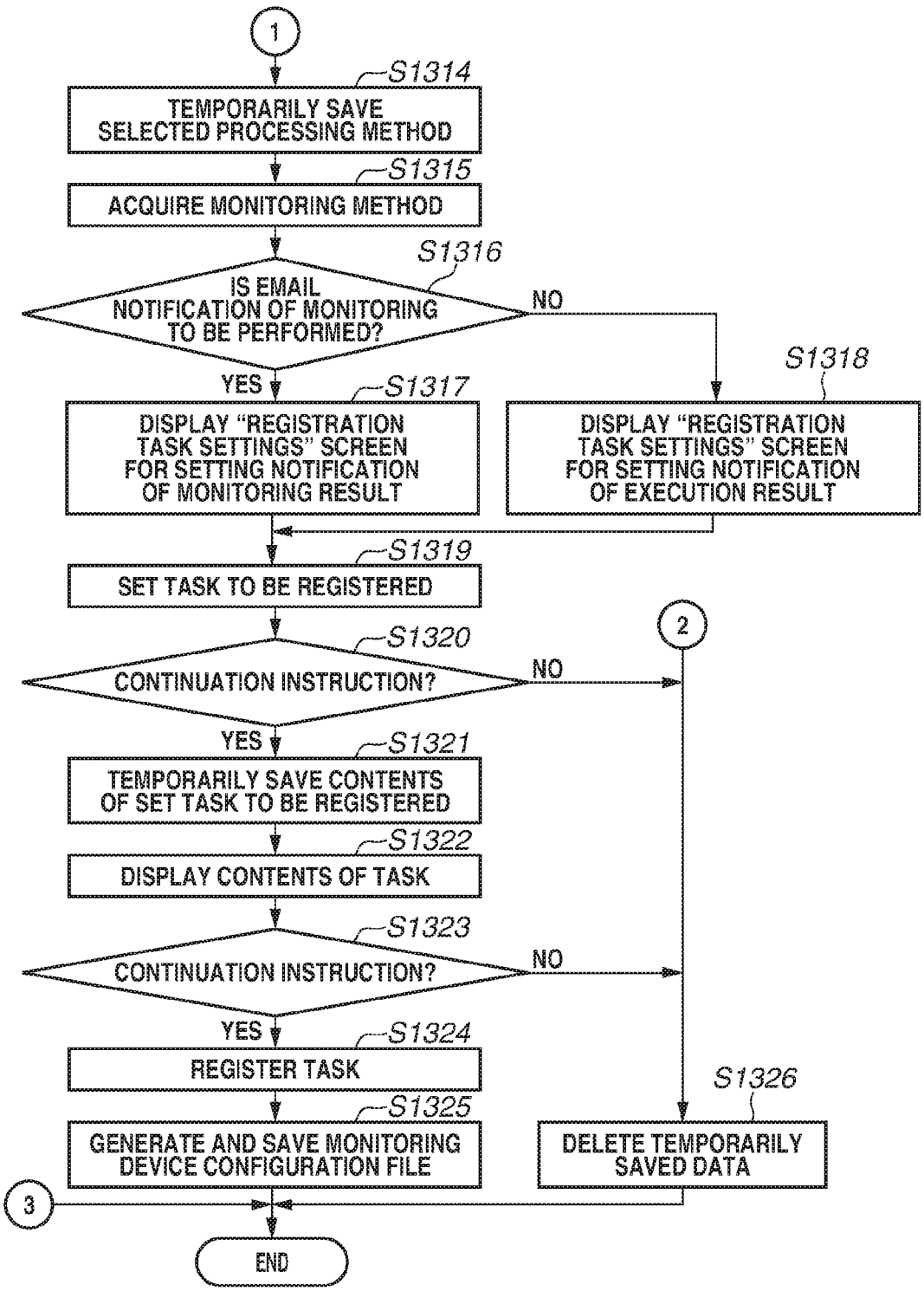
FIG. 14 is a flowchart illustrating the example of the configuration information monitoring task creation process according to the first exemplary embodiment.

Next, with reference to flowcharts in FIGS. 13 and 14, the process of creating a task for monitoring configuration information set for the devices 2000 is illustrated.

FIGS. 13 and 14 are flowcharts illustrating an example of a configuration information monitoring task creation process performed by the device configuration management unit 33 according to the first exemplary embodiment. The processing of these flowcharts is achieved in such a manner that the CPU 10 of the management server 1000 loads a program stored in the HDD 19 into the RAM 12 as necessary and executes the program.

In step S1300, in response to the device configuration management unit 33 detecting that the "creation of configuration information monitoring task" menu is selected, the processing proceeds to step S1301.

In step S1301, the device configuration management unit 33 displays, in the task creation area 62, a "selection of device monitoring item" screen indicating STEP 1 of the "creation of configuration information monitoring task" menu as illustrated in FIG. 8.

FIG. 8 is a diagram illustrating an example of the "selection of device monitoring item" screen.

As illustrated in FIG. 8, the "selection of device monitoring item" screen includes "selection of device configuration file" and "selection of device monitoring item" sections.

The "selection of device configuration file" section is a list box for selecting a device configuration file.

The "selection of device monitoring item" section is a selection list displaying the expansion of the device configuration file selected in the "selection of device configuration file" section into monitoring item candidates and monitoring values, in order for selection of a monitoring item.

Further, the "selection of device monitoring item" screen in FIG. 8 includes a "next" button for a screen transition and a "cancel" button for discontinuing the processing.

In the present exemplary embodiment, the device configuration management unit 33 displays the "selection of device monitoring item" screen in FIG. 8 in which the "selection of device configuration file" section in FIG. 8 includes the display of a list of the file names in the "device configuration file acquisition/setting list" in FIG. 6.

The description returns to FIG. 13 below.

Next, in step S1302, in response to the device configuration management unit 33 detecting that a device configuration file for use in monitoring is selected from the device configuration files displayed in a list in the "selection of device configuration file" section, the processing proceeds to step S1303. A description is given below on the assumption that as an example, "device configuration 1" is selected as a device configuration file for use in monitoring.

Particularly regarding a task for monitoring the security policy in the setting information, it is also possible to separately prepare a graphical user interface (GUI) for generating a task exclusively for the security policy, and generate a task.

In step S1303, the device configuration management unit 33 extracts setting items and setting values from the device configuration file selected in step S1302 and displays, in the task creation area 62, the setting items and the setting values as monitoring item candidates and monitoring values in the "selection of device monitoring item" section. In the above example, the device configuration management unit 33 extracts the setting items 1, the setting items 2, and the setting values illustrated in FIG. 5 from "device configuration 1" and displays the setting items 1 and 2 in "monitoring item candidate" columns and the setting values in a "monitoring value" column.

Next, in step S1304, in response to the device configuration management unit 33 detecting, based on a button action from the KB 17, that a monitoring item to be a monitoring target is selected from the "selection of device monitoring item" section, and also detecting that the "next" button or the "cancel" button is pressed, the processing proceeds to step S1305. A description is given below on the assumption that as an example, the device configuration management unit 33 detects that "timer/time for transition to auto sleep" (monitoring value: 10 minutes) and "network/LPR port number" (monitoring value: 9100) in the monitoring item candidates are selected as monitoring items.

In step S1305, based on whether the "next" button or the "cancel" button is pressed, the device configuration management unit 33 determines whether a continuation instruction is provided.

Then, in a case where it is determined that the "next" button is pressed, the device configuration management unit 33 determines that a continuation instruction is provided (YES in step S1305), and the processing proceeds to step S1306. In a case where, on the other hand, it is determined that the "cancel" button is pressed, the device configuration management unit 33 determines that an end instruction is provided (NO in step S1305), and the processing of this flowchart immediately ends.

In step S1306, the device configuration management unit 33 temporarily saves in the RAM 12 the name of the device configuration file selected in step S1302 and the monitoring item selected in step S1304, and the processing proceeds to step S1307. In the above example, the device configuration management unit 33 temporarily saves the device configuration file name "device configuration 1", and "timer/time for transition to auto sleep" (monitoring value: 10 minutes) and "network/LPR port number" (monitoring value: 9100) in the file as the monitoring items.

In step S1307, the device configuration management unit 33 displays in the task creation area 62 a "selection of monitoring target device" screen indicating STEP 2 of the "creation of configuration information monitoring task" menu, and the processing proceeds to step S1308.

FIG. 9 is a diagram illustrating an example of the "selection of monitoring target device" screen.

As illustrated in FIG. 9, the "selection of monitoring target device" screen includes a "selection of monitoring target device" section, a "next" button for a screen transition, and a "cancel" button for discontinuing the processing.

The "selection of monitoring target device" section is a selection list for selecting a device 2000 to be a monitoring target. In the present exemplary embodiment, the device configuration management unit 33 displays, in the "selection of monitoring target device" section in FIG. 9, the device list in FIG. 4A.

In step S1308, in response to the device configuration management unit 33 detecting that a device 2000 to be a monitoring target is selected from the device list displayed in the "selection of monitoring target device" section, and also detecting that the "next" button or the "cancel" button is pressed, the processing proceeds to step S1309. A description is given below on the assumption that as an example, the devices DevA1 to DevAx and DevB1 to DevBx are selected.

In step S1309, based on whether the "next" button or the "cancel" button is pressed, the device configuration management unit 33 determines whether a continuation instruction is provided.

Then, in a case where it is determined that the "next" button is pressed, the device configuration management unit 33 determines that a continuation instruction is provided (YES in step S1309), and the processing proceeds to step S1310. In a case where, on the other hand, it is determined that the "cancel" button is pressed, the device configuration management unit 33 determines that an end instruction is provided (NO in step S1309), and the processing immediately proceeds to step S1326.

In step S1310, the device configuration management unit 33 temporarily saves, in the RAM 12, information of the monitoring target device selected in step S1308, and the processing proceeds to step S1311. In the above example, the device configuration management unit 33 temporarily saves, in the RAM 12, device information of the devices DevA1 to DevAx and DevB1 to DevBx selected as monitoring target devices 2000.

In step S1311, the device configuration management unit 33 displays, in the task creation area 62, a "setting of monitoring method" screen indicating STEP 3 of the "creation of configuration information monitoring task" menu, and the processing proceeds to step S1312.

FIG. 10 is a diagram illustrating an example of the "setting of monitoring method" screen.

As illustrated in FIG. 10, the "setting of monitoring method" screen includes a "setting of monitoring method" section, a "next" button for a screen transition, and a "cancel" button for discontinuing the processing.

The "setting of monitoring method" section is a selection list for setting an operation (a monitoring setting) in a case where a change of a monitoring value is detected in monitoring of the monitoring target device 2000 which is selected in step S1308 using the monitoring item selected in step S1304.

In the present exemplary embodiment, the device configuration management unit 33 displays the following three methods as a monitoring method.

Forced restoration+email notification
Forced restoration
Email notification

"Forced restoration" means that in a case where a change in a setting of the monitoring target device is detected, the setting value of the monitoring item in which the change is detected is forcibly restored to the previous value (is updated using the monitoring value included in the monitoring information).

Further, "email notification" means that in a case where a change in a setting of the monitoring target device is detected, an email notification of the monitoring item in which the change is detected is performed according to the settings of notification of the monitoring result in FIG. 11A.

The monitoring method (the monitoring setting) is not limited to the above three methods. Alternatively, for example, a method for performing only monitoring, and not performing forced restoration and email notification may be employed.

Alternatively, instead of an email notification, a notification may be performed using various communication tools or communication methods, such as a telephone, a facsimile, a printer, and a social networking service (SNS) that are used by the IT administrator.

In step S1312, in response to the device configuration management unit 33 detecting selection of "operation when change is detected" displayed in the "setting of monitoring method" section, and also detecting that the "next" button or the "cancel" button is pressed, the processing proceeds to step S1313. A description is given below on the assumption that as an example, "forced restoration+email notification" displayed in the "monitoring method" section is selected as an operation when change is detected.

In step S1313, based on whether the "next" button or the "cancel" button is pressed, the device configuration management unit 33 determines whether a continuation instruction is provided.

Then, in a case where it is determined that the "next" button is pressed, the device configuration management unit 33 determines that a continuation instruction is provided (YES in step S1313), and the processing proceeds to step S1314. In a case where, on the other hand, it is determined that the "cancel" button is pressed, the device configuration management unit 33 determines that an end instruction is provided (NO in step S1313), and the processing immediately proceeds to step S1326.

In step S1314, the device configuration management unit 33 temporarily saves, in the RAM 12, setting information of the monitoring method selected in step S1312, and the processing proceeds to step S1315. In the above example, the device configuration management unit temporarily saves the monitoring method "forced restoration+email notification" selected as the setting of the monitoring method.

In step S1315, the device configuration management unit 33 acquires the monitoring method temporarily saved in step S1314, and the processing proceeds to step S1316. In the above example, the device configuration management unit 33 acquires the monitoring method "forced restoration+email notification".

In step S1316, the device configuration management unit 33 determines whether email notification monitoring is to be performed in the monitoring method acquired in step S1315.

Then, in a case where it is determined that an email notification is to be performed (YES in step S1316), the processing proceeds to step S1317. In the above example, since the monitoring method is "forced restoration+email notification", it is determined that an email notification is to be performed.

In step S1317, the device configuration management unit 33 displays, in the task creation area 62, a "task registration settings" screen for the notification of the monitoring result, indicating STEP 4 of the "creation of configuration information monitoring task" menu, and the processing proceeds to step S1319.

FIG. 11A is a diagram illustrating an example of the "task registration settings" screen for the notification of the monitoring result.

As illustrated in FIG. 11A, the "task registration settings" screen for the notification of the monitoring result includes "task name", "schedule settings", and "notification of monitoring result" sections.

The "task name" section is an edit box for setting the name of a task to be registered.

The "schedule settings" section includes "execution schedule" and "execution cycle" and is selection lists and an edit box for setting information of a schedule for executing the registered task. In "execution schedule", it is possible to select the execution schedule of the task, such as "periodically execute", "immediately execute", or "only register and do not execute". Further, in "execution cycle", how to periodically execute the task is set in a case where the execution schedule is "periodically execute".

For example, the following execution cycles are set.
Monthly: specifying of the monitoring date and the monitoring time
Weekly: specifying of the monitoring day of the week and the monitoring time
Daily: specifying of the monitoring time
"Execution schedule" and "execution cycle" are not limited to the above methods. Alternatively, for example, an irregular monitoring schedule or an irregular cycle, such as 09:00 to 17:00 from Monday to Friday and all day on Saturday and Sunday in a certain week, may be set.

Next, the "notification of monitoring result" section includes "notification destination email address" and "notification timing" and is an edit box and a selection list for setting to whom and at what timing an email notification in the monitoring method set in step S1312 is to be performed. If there are a plurality of notification destinations, "notification destination email address" may be specified using a separation mark, such as a semicolon or a comma.

Further, as an example, "notification timing" is selected from the following two methods in FIG. 11A.
Notification only when change is detected
Notification every time task is executed "Notification only when change is detected" means that only in a case where a change is detected in a monitoring item, an email is transmitted to the email address set as "notification destination email address".

On the other hand, "notification every time task is executed" means that regardless of whether a change is detected in a monitoring item, an email notification is performed to the email address set as "notification destination email address".

"Notification timing" is not limited to the above methods, and may be another method.

In a case where, on the other hand, it is determined in step S1316 that an email notification is not to be performed (NO in step S1316), the processing proceeds to step S1318.

In step S1318, the device configuration management unit 33 displays in the task creation area 62 a "task registration settings" screen for the notification of the execution result, indicating STEP 4 of the "creation of configuration information monitoring task" menu.

FIG. 11B is a diagram illustrating an example of the "task registration settings" screen for the notification of the execution result.

As illustrated in FIG. 11B, the "task registration settings" screen for setting the notification of the execution result is obtained by changing the "notification of monitoring result" section in the "task registration settings" screen for the notification of the monitoring result in FIG. 11A to a "notification of execution result" section.

The sections other than the "notification of execution result" section are similar to those of the "task registration settings" screen for the notification of the monitoring result.

The "notification of execution result" section includes a check box for setting whether to set an email notification and a field for notification destination email address. When the check box is checked, it is possible to set a notification destination email address to which a notification of the execution result of the monitoring task is to be performed. Alternatively, the check box for setting whether to set an email notification may not be provided, and a notification destination email address may be always set.

After the process of step S1317 or S1318, the processing proceeds to step S1319.

In step S1319, in response to the device configuration management unit 33 detecting that the contents of the task to be registered as illustrated in FIG. 11A or 11B are set, and also detecting that the "next" button or the "cancel" button is pressed, the processing proceeds to step S1320. A description is given below on the assumption that as an example, as illustrated in FIG. 11A, settings are set so that the device configuration management unit 33 performs monitoring by periodically executing a task having the task name "setting monitoring task" at 12:00 every day according to the schedule, and gives an email notification to "admin@xxx.yy.zz" only when a change is detected.

In step S1320, based on whether the "next" button or the "cancel" button is pressed, the device configuration management unit 33 determines whether a continuation instruction is provided.

Then, in a case where it is determined that the "next" button is pressed, the device configuration management unit 33 determines that a continuation instruction is provided (YES in step S1320), and the processing proceeds to step S1321. In a case where, on the other hand, it is determined that the "cancel" button is pressed, the device configuration management unit 33 determines that an end instruction is provided (NO in step S1320), and the processing immediately proceeds to step S1326.

In step S1321, the device configuration management unit 33 temporarily saves in the RAM 12 the contents of the task to be registered that have been set in step S1319, and the processing proceeds to step S1322. In the above example, the device configuration management unit 33 temporarily saves the settings for, as illustrated in FIG. 11A, performing monitoring by periodically executing the task having the task name "setting monitoring task" at 12:00 every day according to the schedule, and for giving the email notification to "admin@xxx.yy.zz" only when a change is detected.

In step S1322, the device configuration management unit 33 displays in the task creation area 62 a "confirmation of registration contents" screen indicating STEP 5 of the "creation of configuration information monitoring task" menu, and the processing proceeds to step S1323.

FIG. 12 is a diagram illustrating an example of the "confirmation of registration contents" screen.

As illustrated in FIG. 12, the "confirmation of registration contents" screen includes "task name", "schedule settings", "notification of monitoring result", "monitoring method", "monitoring target device", "monitoring information", and "device configuration file" sections. Further, the "confirmation of registration contents" screen in FIG. 12 includes a "register" button for saving the created task in the data storage unit 34 and a "cancel" button for discontinuing the processing.

The device configuration management unit 33 displays, in each section, the information set in steps S1302, S1304, S1308, S1312, and S1319. In the above example, as illustrated in FIG. 12, the device configuration management unit 33 displays the following information.

Task name: setting monitoring task
Schedule settings: periodically execute daily at 12:00
Notification of monitoring result: email notification to admin@xxx.yy.zz only when change is detected
Monitoring target device: DevA1 to DevAx and DevB1 to DevBx
Monitoring information: timer/time for transition to auto sleep (monitoring value: 10 minutes) and network/LPR port number (monitoring value: 9100)
Device configuration file: device configuration 1

In step S1323, based on whether the "register" button or the "cancel" button is pressed, the device configuration management unit 33 determines whether a continuation instruction is provided.

Then, in a case where it is determined that the "register" button is pressed, the device configuration management unit 33 determines that a continuation instruction is provided (YES in step S1323), and the processing proceeds to step S1324. In a case where, on the other hand, it is determined that the "cancel" button is pressed, the device configuration management unit 33 determines that an end instruction is provided (NO in step S1323), and the processing immediately proceeds to step S1326.

In step S1324, the device configuration management unit 33 saves in the data storage unit 34 the contents of the task to be registered that have been temporarily saved in the RAM 12 in steps S1306, S1310, S1314, and S1321, and the processing proceeds to step S1325. In the above example, the device configuration management unit 33 saves in the data storage unit 34 the monitoring task illustrated in FIG. 12.

In step S1325, the device configuration management unit 33 generates a monitoring device configuration file (hereinafter referred to as a "monitoring file") including the monitoring information temporarily saved in the RAM 12 in step S1306 and saves the monitoring file in the device configuration data storage unit 35. For example, it is assumed that similarly to the existing device configuration file illustrated in FIG. 5, the device configuration management unit 33 generates a device configuration file including the following monitoring information, using a file name as a task name, and saves the device configuration file in the device configuration data storage unit 35.

File name: setting monitoring task
Setting item 1: timer, setting item 2: time for transition to auto sleep, setting value: 10 minutes
Setting item 1: network, setting item 2: LPR port number, setting value: 9100

That is, at the timing for generating a monitoring task, monitoring data for use in the monitoring task is associated with the monitoring task and saved. Thus, the administrator can easily generate a monitoring task using appropriate monitoring data according to the characteristics of a device to be a monitoring target, without trouble. Thus, even in a large-scale device management system, it is possible to prevent the trouble of monitoring and an increase in the cost.

It is also possible to monitor a particular setting value, such as a setting value of the security policy without generating a monitoring file. Specifically, the management server 1000 manages the versions of the entire security policy in advance. Then, when a task of monitoring the security policy is generated, not a setting item as described above but any one of the versions is selected as a setting content to be monitored. Then, a security policy corresponding to the selected version is identified, and therefore, the identified security policy is used for monitoring. A setting value set on the device side is compared with the identified security policy, thereby monitoring is performed according to the settings of the generated task. That is, in the present exemplary embodiment, it is also taken into consideration that even in setting information that can be monitored, information to be selected or prepared when a monitoring task is generated differs depending on whether a setting value as a monitoring target is related to setting information of the security policy or related to setting information of a specific type other than the security policy.

In a case where a configuration information monitoring task with respect to the devices 2000 is to be created again and when a device monitoring item is selected in FIG. 8, the device configuration management unit 33 can use the device configuration file saved in the device configuration data storage unit 35 in step S1325. A monitoring file is thus used, whereby it is possible to significantly reduce the trouble of the administrator when a task is created.

After the process of step S1325, the processing of this flowchart ends.

Further, as described above, in a case where, based on a button action from the KB 17, the device configuration management unit 33 determines in steps S1309, S1313, S1320, and S1323 that the "cancel" button is pressed, the processing proceeds to step S1326. In step S1326, the device configuration management unit 33 deletes the data temporarily saved in the RAM 12 in steps S1306, S1310, S1314, and S1321, and the processing of this flowchart ends.

Figure 15:
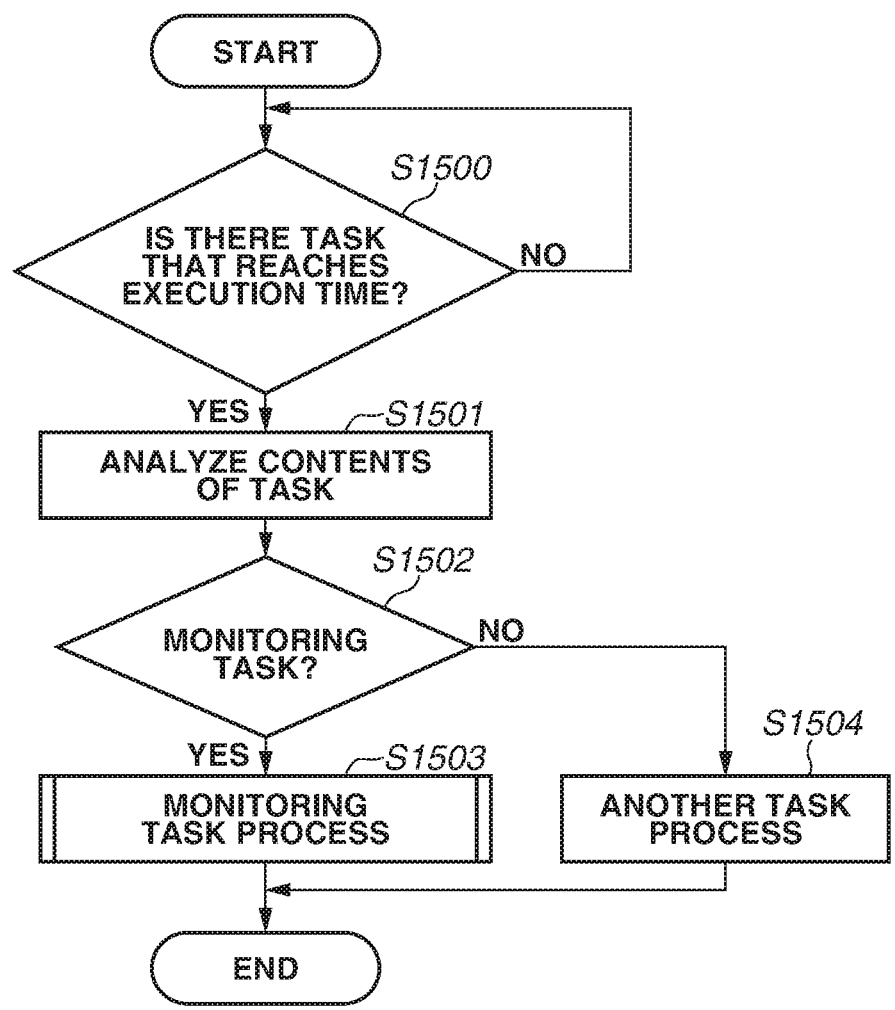
FIG. 15 is a flowchart illustrating an example of a task execution process according to the first exemplary embodiment.
Figure 16:
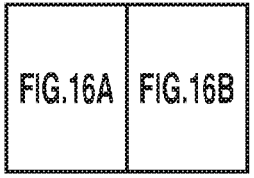
FIG. 16 (consisting of FIGS. 16A and 16B) is a flowchart illustrating an example of a monitoring task process according to the first exemplary embodiment.
Figure 16A:
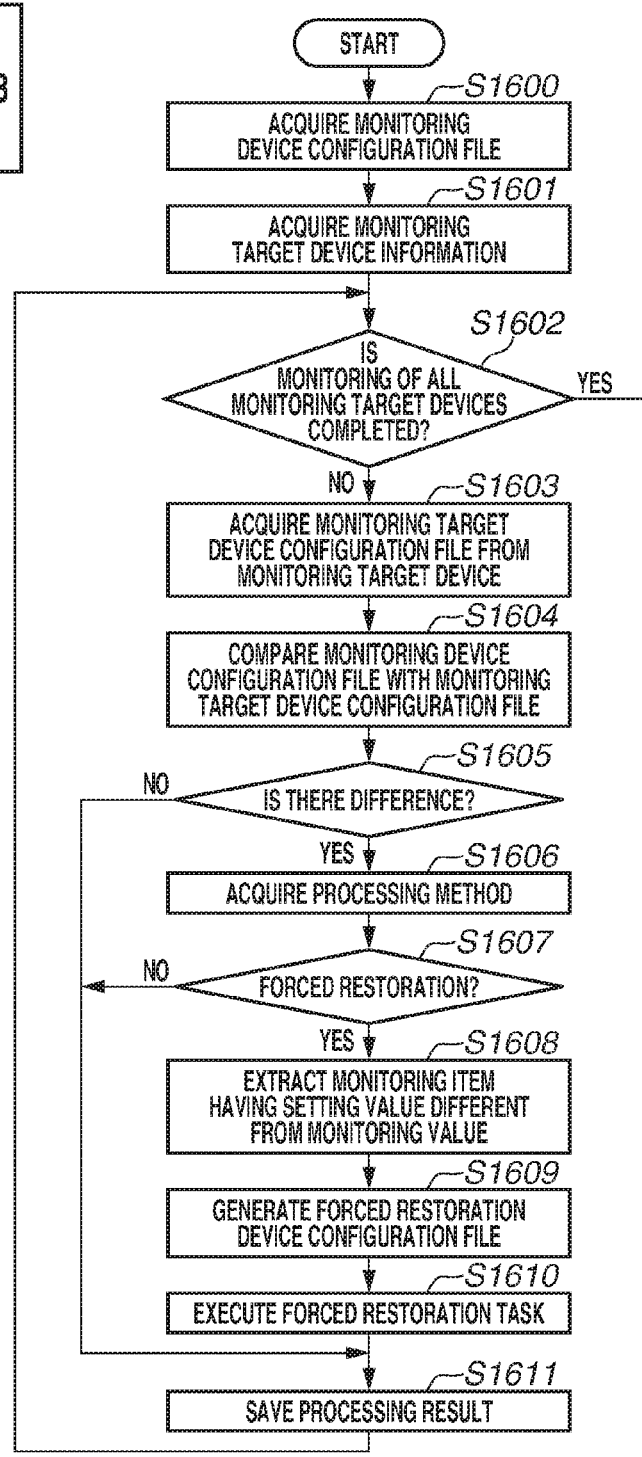
Figure 16B:
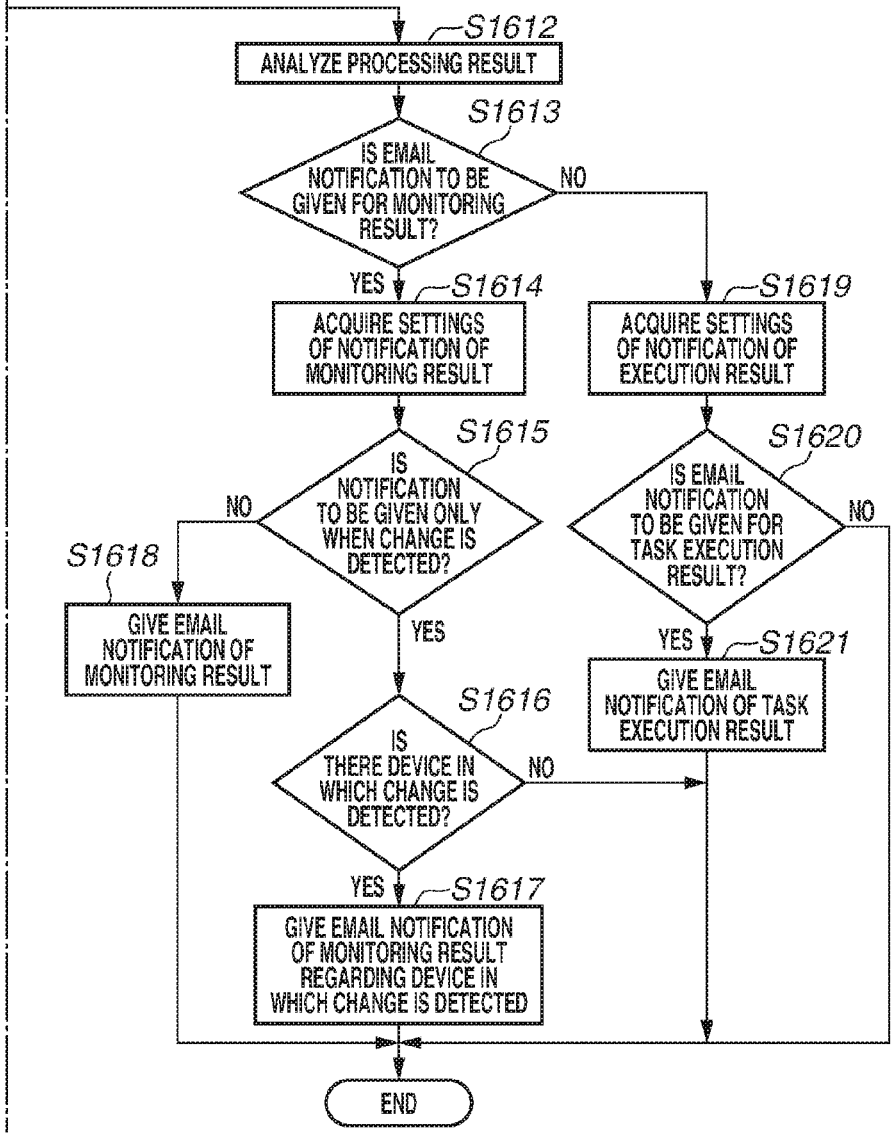

Next, with reference to flowcharts in FIGS. 15 and 16 (consisting of FIGS. 16A and 16B), a task execution process is described. For example, a description is given of the process for executing the configuration information monitoring task with respect to the devices 2000 saved in the data storage unit 34 in the configuration information monitoring task creation process in FIGS. 13 and 14.

FIG. 15 is a flowchart illustrating an example of the task execution process. The processing of the flowcharts in FIGS. 15 and 16 is achieved in such a manner that the CPU 10 of the management server 1000 loads a program stored in the HDD 19 into the RAM 12 as necessary and executes the program.

In step S1500, the task management unit 32 determines whether among tasks saved in the data storage unit 34, there is a task that reaches the execution time of the task according to the task schedule. Then, in a case where it is determined that there is not a task that reaches the execution time of the task according to the task schedule (NO in step S1500), the task management unit 32 continues the determination in step S1500.

In a case where, on the other hand, it is determined that there is a task that reaches the execution time of the task according to the task schedule (YES in step S1500), the task management unit 32 notifies the storage source of the task (the device search unit 31 or the device configuration management unit 33) of the determination result, and the processing proceeds to step S1501. A description is given on the assumption that as an example, the task management unit 32 notifies the device configuration management unit 33 that there is a task that reaches the execution time.

In step S1501, the device configuration management unit 33 instructed by the task management unit 32 to execute the task acquires, from the data storage unit 34, task information of the task that the device configuration management unit 33 is instructed to execute. Then, the device configuration management unit 33 analyzes the contents of the task. A description is given below on the assumption that the task acquired from the data storage unit 34 by the device configuration management unit 33 is the device configuration information monitoring task saved in step S1324.

Next, in step S1502, the device configuration management unit 33 determines whether the task analyzed in step S1501 is a configuration information monitoring task with respect to the devices 2000.

Then, in a case where it is determined that the analyzed task is a configuration information monitoring task (YES in step S1502), the processing proceeds to step S1503. In the above example, the device configuration management unit 33 determines that the analyzed task is a configuration information monitoring task. Then, the device configuration management unit 33 performs the process for executing a device monitoring task.

In step S1503, the device configuration management unit 33 executes a monitoring task process illustrated in FIG. 16, and the processing of this flowchart ends.

In a case where, on the other hand, it is determined in step S1502 that the analyzed task is not a configuration information monitoring task (NO in step S1502), the processing proceeds to step S1504.

In step S1504, the device configuration management unit 33 performs the process for executing a task other than a configuration information monitoring task, and the processing of this flowchart ends.

Next, with reference to the flowchart in FIG. 16, the details of the monitoring task process with respect to the devices 2000 in step S1503 are described.

FIG. 16 is a flowchart illustrating an example of a monitoring task process according to the first exemplary embodiment.

First, in step S1600, the device configuration management unit 33 acquires a monitoring device configuration file corresponding to the contents of the configuration information monitoring task with respect to the devices 2000 analyzed in step S1501 and saved in the device configuration data storage unit 35 in step S1325. Hereinafter, this monitoring device configuration file will be referred to as a "monitoring file". In the above example, the device configuration management unit 33 acquires a monitoring file including "timer/time for transition to auto sleep" (monitoring value: 10 minutes) and "network/LPR port number" (monitoring value: 9100).

Next, in step S1601, the device configuration management unit 33 acquires, based on the contents of the configuration information monitoring task with respect to the devices 2000 analyzed in step S1501, monitoring target device information of the monitoring target devices selected in step S1308. In the above example, the device configuration management unit 33 acquires the devices DevA1 to DevAx and DevB1 to DevBx as the monitoring target device information.

Next, in step S1602, the device configuration management unit 33 determines whether the monitoring of the monitoring target devices 2000 acquired in step S1601 is completed. In the above example, the device configuration management unit 33 determines whether the monitoring of device configuration information of the devices DevA1 to DevAx and DevB1 to DevBx is completed.

Then, in a case where it is determined that the monitoring is not yet completed (NO in step S1602), the device configuration management unit 33 acquires, from among all the devices 2000 selected as monitoring targets, a device 2000 that has not yet been processed (hereinafter referred to as a "monitoring target device 2000"), and the processing proceeds to step S1603. In a case where, on the other hand, it is determined that the monitoring is already completed (YES in step S1602), the processing proceeds to step S1612. That is, the device configuration management unit 33 repeats the processes for the following steps S1603 to S1611 until the monitoring of configuration information of all the monitoring target devices 2000 is completed.

In step S1603, the device configuration management unit 33 acquires, from the device configuration service unit 36 of the monitoring target device 2000, a device configuration file of the monitoring target device 2000 corresponding to the monitoring file acquired in step S1600. Hereinafter, the device configuration file of the monitoring target device 2000 will be referred to as a "monitoring target file". In the above example, the device configuration management unit 33 acquires a monitoring target file including "timer/time for transition to auto sleep" and "network/LPR port number" from the device configuration service unit 36 of the device DevA1. As described above, in the present exemplary embodiment, it is assumed that a device configuration file including only a setting item and a setting value corresponding to the setting item selected in step S1304 is acquired. The present invention, however, also includes the configuration in which a device configuration file including all setting items and setting values is acquired.

Next, in step S1604, the device configuration management unit 33 performs the process for comparing the monitoring file acquired in step S1600 with the monitoring target file acquired in step S1603. In the above example, the device configuration management unit 33 compares the monitoring value and the setting value of "timer/time for transition to auto sleep" with each other, and compares the monitoring value and the setting value of "network/LPR port number" with each other.

Next, in step S1605, as a result of the comparison in step S1604, the device configuration management unit 33 determines whether there is a difference. Then, in a case where it is determined that there is a difference (YES in step S1605), the processing proceeds to step S1606. A description is given below on the assumption that as an example, the device configuration management unit 33 determines that there is no change in the monitoring item "network/LPR port number" from the monitoring value 9100. On the other hand, regarding the monitoring item "timer/time for transition to auto sleep", the monitoring value is 10 minutes, whereas the setting value is 20 minutes. Thus, the device configuration management unit 33 determines that there is a change in the monitoring item "timer/time for transition to auto sleep".

Then, in a case where it is determined in step S1605 that there is no difference (NO in step S1605), the processing immediately proceeds to step S1611.

In a case where, on the other hand, it is determined that there is a difference (YES in step S1605), the processing proceeds to step S1606.

In step S1606, the device configuration management unit 33 acquires, based on the contents of the configuration information monitoring task with respect to the devices 2000 analyzed in step S1501, the monitoring method set in step S1312. In the above example, the device configuration management unit 33 acquires "forced restoration+email notification" as the monitoring method.

Next, in step S1607, the device configuration management unit 33 determines whether "forced restoration" is set as the monitoring method acquired in step S1606.

Then, in a case where it is determined that "forced restoration" is not set as the monitoring method (NO in step S1607), the processing immediately proceeds to step S1611.

In a case where, on the other hand, it is determined that "forced restoration" is set as the monitoring method (YES in step S1607), the processing proceeds to step S1608. In the above example, since the monitoring method is "forced restoration+email notification", the device configuration management unit 33 determines that "forced restoration" is set.

In step S1608, the device configuration management unit 33 extracts from the monitoring file the monitoring item having the setting value different from the monitoring value in step S1604. In the above example, the device configuration management unit 33 extracts, from the monitoring file, the monitoring item "timer/time for transition to auto sleep" having the setting value "20 minutes", which is different from the monitoring value "10 minutes".

Next, in step S1609, the device configuration management unit 33 generates a forced restoration device configuration file (hereinafter referred to as a "restoration file") including the monitoring item extracted in step S1608 and the setting value to be subjected to forced restoration. In the above example, the device configuration management unit 33 generates a restoration file including the monitoring item "timer/time for transition to auto sleep" and the setting value "10 minutes" to be subjected to forced restoration.

Next, in step S1610, the device configuration management unit 33 executes a forced restoration task, which is a device setting task involving the restoration file generated in step S1609, with respect to the device configuration service unit 36 of the monitoring target device 2000, thereby the setting value of the monitoring target device 2000 is restored to a normal value. In the above example, the device configuration management unit 33 executes, with respect to the device configuration service unit 36 of the monitoring target device DevA1, a forced restoration task for restoring the setting item "timer/time for transition to auto sleep" from the setting value "20 minutes" to "10 minutes".

After the process of step S1610, the processing proceeds to step S1611.

In step S1611, the device configuration management unit 33 saves the processing result in step S1610 in the data storage unit 34. In the above example, the device configuration management unit 33 saves, in the data storage unit 34, information in which the setting value of the setting item "timer/time for transition to auto sleep" of the device DevA1 is changed to "10 minutes".

As described above, also in a case where there is no difference (NO in step S1605), or in a case where forced restoration is not to be performed (NO in step S1607), the device configuration management unit 33 executes the process of step S1611. In this case, however, it is assumed that the device configuration management unit 33 saves as the processing result the fact that there is no difference, or the fact that forced restoration is not to be performed. For example, in a case where there is no difference between the monitoring file and the monitoring target file in the devices 2000 as monitoring targets other than the device DevA1, the device configuration management unit 33 saves, in the data storage unit 34, the result that there is no difference between the monitoring file and the monitoring target file in the devices 2000 as monitoring targets other than the device DevA1.

After the process of step S1611, the processing returns to step S1602.

In a case where it is determined in step S1602 that the monitoring of all the monitoring target devices 2000 acquired in step S1601 is completed (YES in step S1602), the processing proceeds to step S1612.

In step S1612, the device configuration management unit 33 acquires the processing result saved in the data storage unit 34 in step S1611. In the above example, the device configuration management unit 33 acquires the processing result of the monitoring target devices DevA1 to DevAx and DevB1 to DevBx.

Next, in step S1613, the device configuration management unit 33 determines whether "email notification" is set as the monitoring method in the configuration information monitoring task with respect to the devices 2000 analyzed in step S1501. Then, in a case where it is determined that "email notification" is set as the monitoring method (YES in step S1613), the processing proceeds to step S1614. In the above example, since the monitoring method is "forced restoration+email notification", the device configuration management unit 33 determines that "email notification" is set.

In step S1614, the device configuration management unit 33 acquires the settings of notification of the monitoring result from the contents of the task analyzed in step S1501. In the above example, the device configuration management unit 33 acquires the notification destination email address "admin@xxx.yy.zz" and the notification timing "notification only when change is detected" as the settings of notification of the monitoring result.

Next, in step S1615, the device configuration management unit 33 determines, based on step S1614, whether the notification timing is "notification only when change is detected". Then, in a case where it is determined that the notification timing is "notification only when change is detected" (YES in step S1615), the processing proceeds to step S1616. In the above example, the device configuration management unit 33 determines that the notification timing is "notification only when change is detected", and the processing proceeds to step S1616.

In step S1616, based on the processing result acquired in step S1612, the device configuration management unit 33 determines whether there is a device 2000 in which a change is detected. Then, in a case where it is determined that there is a device 2000 in which a change is detected (YES in step S1616), the processing proceeds to step S1617. In a case where, on the other hand, it is determined in step S1616 that there is not a device 2000 in which a change is detected (NO in step S1616), the processing of this flowchart immediately ends.

In the above example, the device configuration management unit 33 determines that a change is detected in the device 2000 DevA1, and the processing proceeds to step S1616.

In step S1617, the device configuration management unit 33 provides an email notification of the processing result of the device 2000 in which a change is detected, to the notification destination email address acquired in step S1614, and the processing of this flowchart ends. In the above example, the device configuration management unit 33 provides an email notification of the processing result of the device DevA1 in which a change is detected, to the notification destination email address "admin@xxx.yy.zz".

In this process, in the email for the processing result of the device 2000 in which a change is detected, the device configuration management unit 33 can also attach a file of detailed information of the processing result in addition to the processing result in the email text. This is because in a case where many devices 2000, namely several hundreds to several thousands of devices 2000 as monitoring targets, are monitored, it is not possible to communicate a sufficient processing result by the email text alone. An example of this is illustrated in FIG. 24.

Figure 24:
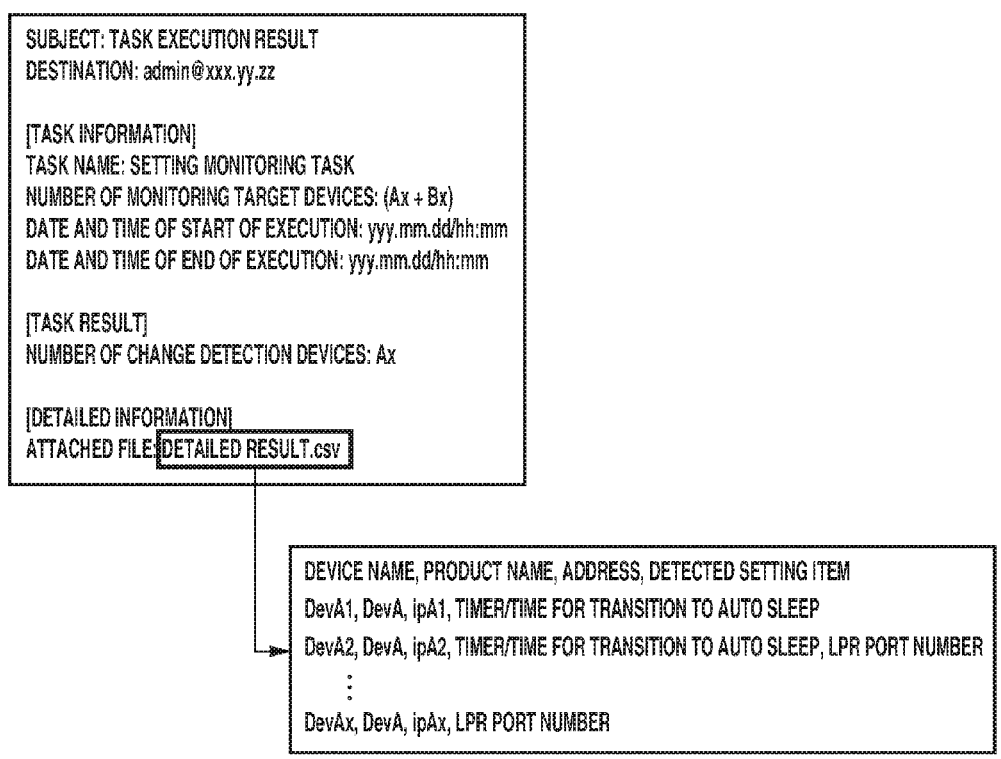
FIG. 24 is a diagram illustrating an example of an email text and an attached file according to the first exemplary embodiment.

FIG. 24 is a diagram illustrating an example of the email text and the attached file as detailed information of the email text.

The email text includes a subject, a destination, [task information], a [task result], and [detailed information]. The task information includes a task name, the number of monitoring target devices, the date and time of the start of execution, and the date and time of the end of execution. Further, the [task result] includes the number of change detection devices, and the [detailed information] includes an attached file name. Meanwhile, the attached file name includes a device name, a product name, an address, and a setting item in which a change is detected in its setting value.

In the present exemplary embodiment, the device configuration management unit 33 forms the email text as follows according to the creation task illustrated in FIG. 12.
Subject: task execution result
Destination: admin@xxx.yy.zz
Task name: setting monitoring task
Number of monitoring target devices: (Ax+Bx)
Date and time of start of execution: yyyy.mm.dd/hh:mm
Date and time of end of execution: yyyy.mm.dd/hh:mm
Number of change detection devices: Ax
Attached file: detailed result.csv That is, it is indicated that (Ax+Bx) devices 2000, namely the devices DevA1 to DevAx and DevB1 to DevBx, are monitored based on the monitoring items "time for transition to auto sleep" and "LPR port number", and changes are detected in Ax devices, namely the devices DevA1 to DevAx.

Further, it is indicated that the detailed result of the detection is provided as the attached file "detailed result.csv". In the present exemplary embodiment, the device configuration management unit 33 describes, in the attached file "detailed result.csv", the details of the detection result of the devices DevA1 to DevAx in which changes are detected in the values of monitored setting items.

It is indicated that in the device DevA1 having the device name "DevA1", the product name "DevA", and the address "ipA1", a change is detected in time for transition to auto sleep". In the device DevA2, changes are detected in time for transition to auto sleep" and "LPR port number". In the device DevAx, a change is detected in "LPR port number".

In this process, it is also possible to add the following information as detailed information to be displayed in a CSV file as the attached file. That is, it is also possible to add, for a device 2000 in which a change is detected in the value of a monitoring item, information about to what value the detected setting item is changed (the information may also include the value before the change). Alternatively, it is also possible to add, to the attached file, information of a device 2000 in which a change is not detected in the value of a monitoring item.

The file to be attached may be in any file format, such as a CSV file or an Extensible Markup Language (XML) file. Further, the attached information may be a file itself, or may be a link file associated with a file.

Further, in a case where it is determined in step S1615 that the notification timing is not "notification only when change is detected" (NO in step S1618), the processing proceeds to step S1618.

In step S1618, regardless of whether a change is detected, the device configuration management unit 33 provides an email notification of the processing result of the device 2000 to the notification destination email address acquired in step S1614, and the processing of this flowchart ends. It is assumed that the email for the notification in step S1618 is also similar to the email illustrated in FIG. 24. In a case where a change is detected, an attached file similar to the attached file illustrated in FIG. 24 is attached to the email.

In a case where it is determined in step S1613 that "email notification" is not set as the monitoring method (NO in step S1613), the processing proceeds to step S1619.

In step S1619, the device configuration management unit 33 acquires the settings of notification of the execution result from the registration task information analyzed in step S1501. In the above example, the device configuration management unit 33 acquires the notification destination email address "admin@xxx.yy.zz" as the setting of notification of the execution result.

In step S1620, the device configuration management unit 33 determines whether a setting is set so that an email notification is to be provided for the task result (whether the check box for an email notification in FIG. 11B is checked). Then, in a case where it is determined that a setting is set so that an email notification is to be provided for the task result (YES in step S1620), the processing proceeds to step S1621. In a case where a check box for setting whether to provide an email notification is not provided, the determination in step S1620 is always "YES", and the processing proceeds to step S1621.

In step S1621, the device configuration management unit 33 provides an email notification of the execution result of the task to the notification destination email address acquired in step S1619, and the processing of this flowchart ends. In the above example, the device configuration management unit 33 provides an email notification of the execution result of the task to the notification destination email address "admin@xxx.yy.zz". Regarding the email for the notification in step S1621, a notification is provided using an email having a content allowing the confirmation of the fact that the task is executed. This email may be similar to the email illustrated in FIG. 24, or may be an email to which an attached file as illustrated in FIG. 24 is not attached.

In a case where, on the other hand, it is determined that a setting is not set so that an email notification is to be provided for the task result (NO in step S1620), the processing of this flowchart immediately ends.

In this monitoring task process, the IT administrator can confirm the processing result saved in the data storage unit 34 in step S1611, on an operation unit (the KB 17 or the DSP 15) of the management server 1000 or a screen of a web browser connected to the management server 1000 at any timing.

Based on the above processing, it is possible to achieve an improvement in the operability of a monitoring procedure for setting information of the devices 2000 and appropriate remote monitoring according to device characteristics, and reduce the management cost, of an IT administrator, relating to a computer system. Particularly, in a large-scale device management system, it is possible to expect a significant reduction in the management cost. That is, it is possible to reduce the trouble of and the management cost to an IT administrator when setting information of a network device is monitored.

In recent years, the strengthening of security is regarded as more important than before. Accordingly, device configuration information of the devices 2000 is also broadly classified into the following data types (data types 1 to 3).

Data type 1: a security policy setting item for setting a policy regarding security (a setting item of a type related to a policy of security)

Data type 2: a security setting item linked to the data type 1 (a setting item of a type linked to the data type 1)

Data type 3: a non-security setting item not linked to the data type 1 (a setting item of a type not linked to the data type 1)

For example, the data type 1 corresponds to an item for setting "LPR port usability". The data type 2 corresponds to an item for setting "LPR port number", which is linked to "LPR port usability" of the data type 1. In a case where "LPR port usability" of the data type 1 is set to "usable", "LPR port number" of the data type 2 can be set. In a case where, on the other hand, "LPR port usability" is set to "unusable", the setting item "LPR port number" itself cannot be set. That is, the setting item of the data type 2 is subordinate to the setting item of the data type 1.

The data type 3 corresponds to a setting item not related to "LPR port usability" of the data type 1, such as "time for transition to auto sleep".

The devices 2000 in a large-scale device management system include both a device 2000 supporting the data type 1 and a device 2000 not supporting the data type 1.

Further, there is a case where the data type 1 is monitored separately from the data type 2, which is subordinate to the data type 1, and the data type 3, which is not related to the data type 1.

For example, the data type 1 is often monitored by an IT administrator who defines the security policy itself of the entirety of the office, and the data types 2 and 3 are often monitored by an IT administrator of a department where the devices 2000 actually operate.

In such a case, it is desirable that the IT administrator monitoring the data types 2 and 3 should dynamically change a monitoring item based on a selected monitoring item and whether a monitoring target device 2000 supports the data type 1.

For example, there is a case where a device configuration file selected on the "selection of device monitoring item" screen in FIG. 8 includes the data types 1 to 3, and the "LPR port usability" item is set to "unusable" in the data type 1.

In this case, the "LPR port number" item of the data type 2 cannot be set for a device 2000 supporting the data type 1 in the first place. Thus, it is not necessary to monitor the "LPR port number" item.

On the other hand, it is necessary to monitor "LPR port number" for a device 2000 not supporting the data type 1.

Based on the above, FIG. 17 illustrates an example of (a list of) the relationship between a data type included in a device configuration file and a monitoring target data type according to a data type supported by a monitoring target device 2000.

The list illustrated in FIG. 17 includes a data configuration, a configuration data type, and a monitoring target data type according to a data type supported by a monitoring target device 2000.

For example, a data configuration 1 includes the data types 1 to 3.

In this case, it is desirable that the monitoring target data type for a device 2000 supporting the data type 1 should be a data type 2A and the data type 3. The "data type 2A" means a data type including a setting item that does not need to be a monitoring target based on a setting value of the data type 1 as described above.

Further, it is desirable that the monitoring target data type for a device 2000 not supporting the data type 1 should be the data types 2 and 3.

Next, a data configuration 2 includes the data types 1 and 2.

In this case, it is desirable that the monitoring target data type for a device 2000 supporting the data type should be the data type 2A, and the monitoring target data type for a device 2000 not supporting the data type 1 should be the data type 2.

Next, a data configuration 3 includes the data types 2 and 3.

In this case, it is desirable that the monitoring target data type should be the data types 2 and 3, regardless of whether a device 2000 supporting the data type 1 or not. This is because the data type 1 is not included as a configuration data type, and therefore, the monitoring target data type is the same, regardless of whether a device 2000 supporting the data type 1 or not.

Next, a data configuration 4 includes the data types 1 and 3.

In this case, it is desirable that the monitoring target data type should be only the data type 3, regardless of whether a device 2000 supporting the data type 1 or not.

Next, a data configuration 5 includes only the data type 1.

In this case, it is desirable that the monitoring target data type should not be present, regardless of whether a device 2000 supporting the data type 1 or not.

Next, a data configuration 6 includes only the data type 2.

In this case, it is desirable that the monitoring target data type should be only the data type 2, regardless of whether a device 2000 supporting the data type 1 or not.

Next, a data configuration 7 includes only the data type 3.

In this case, it is desirable that similarly to the data configuration 4, the monitoring target data type should be only the data type 3, regardless of whether a device 2000 supporting the data type 1 or not.

A description is given below of the process of achieving the monitoring illustrated in FIG. 17, the process performed by the device management unit 30.

Figure 18B:
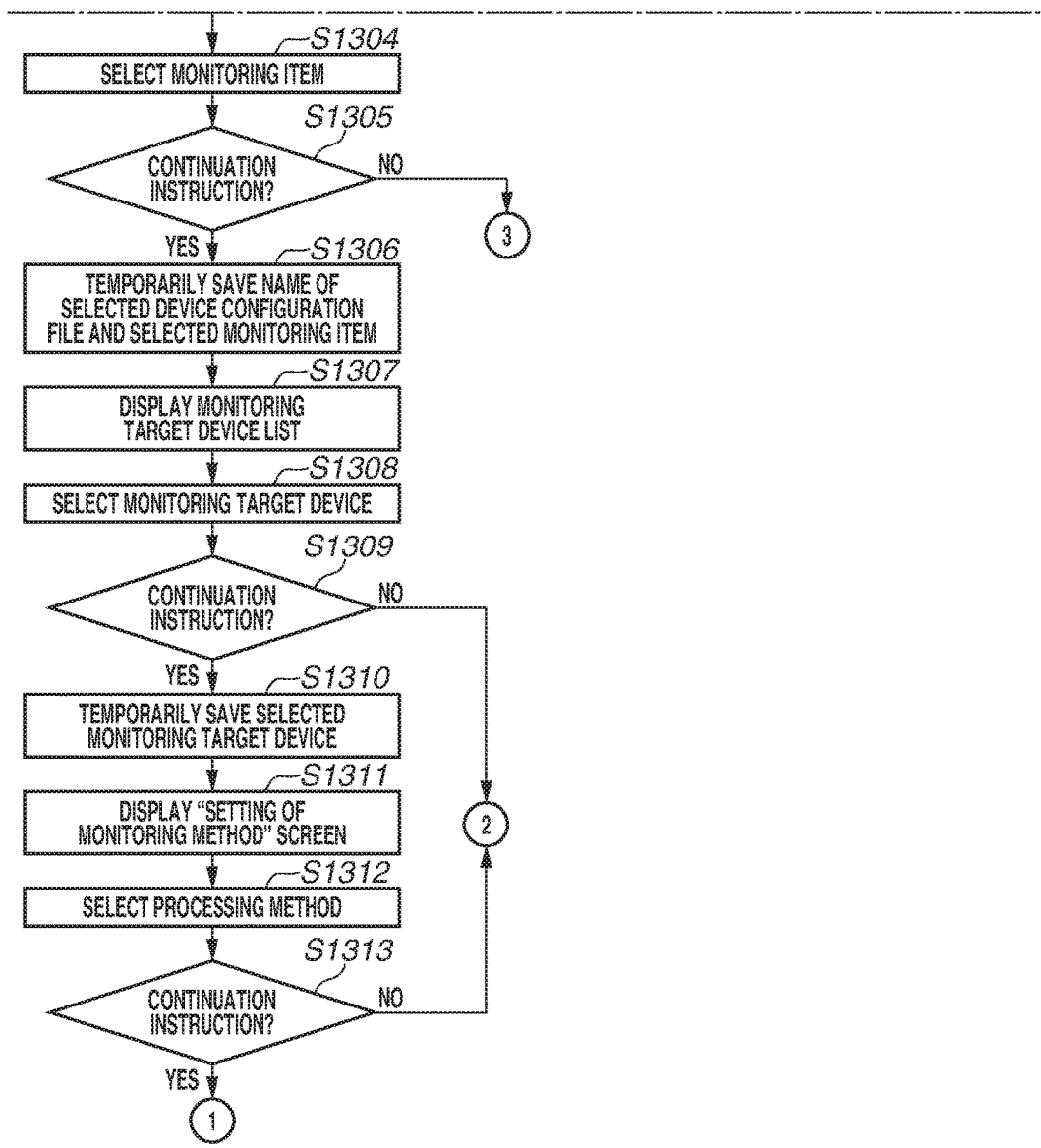
FIG. 18 (consisting of FIGS. 18A and 18B) is a flowchart illustrating an example of a configuration information monitoring task creation process according to the second exemplary embodiment.

FIG. 18 (consisting of FIGS. 18A and 18B) is a flowchart illustrating an example of a configuration information monitoring task creation process performed by the device configuration management unit 33 according to a second exemplary embodiment. The processing of this flowchart is achieved in such a manner that the CPU 10 of the management server 1000 loads a program stored in the HDD 19 into the RAM 12 as necessary and executes the program. The flowchart in FIG. 18 is obtained by replacing step S1303 in the flowchart in FIG. 13 with steps S1800 to S1810.

In step S1302, in a case where the device configuration management unit 33 detects that a device configuration file is selected, the processing proceeds to step S1800.

In step S1800, the device configuration management unit 33 determines whether the data configuration of the device configuration file selected in step S1302 is the data configuration 1 or 2 illustrated in FIG. 17. It is assumed that the data types for determining the data configuration are defined in advance and stored in the HDD 19 or the like of the management server 1000.

Then, in a case where it is determined that the data configuration of the device configuration file selected in step S1302 is the data configuration 1 or 2 (YES in step S1800), the processing proceeds to step S1801. For example, it is assumed that the device configuration 1 illustrated in FIG. 5 is the data configuration 1.

In step S1801, the device configuration management unit 33 extracts a setting item of the data type to which setting information of the data type 1 is applied. In the above example, "LPR port usability" is set to "unusable" in the data type 1, and it is determined that "LPR port number" of the data type 2, which is related to the data type 1, cannot be set. Thus, the device configuration management unit 33 extracts "LPR port number".

Next, in step S1802, the device configuration management unit 33 determines whether there is a setting item of the data type 2 to which setting information of the data type 1 is applied.

Then, in a case where it is determined that there is a setting item of the data type 2 to which setting information of the data type 1 is applied (YES in step S1802), the processing proceeds to step S1803. In the above example, the device configuration management unit 33 determines that "LPR port number" is a setting item to which setting information of the data type 1 is applied. Thus, the processing proceeds to step S1803.

In step S1803, the device configuration management unit 33 temporarily saves, in the RAM 12, the setting item extracted in step S1801 as a setting item of the data type 2 that is not a monitoring target, and the processing proceeds to step S1804. In the above example, the device configuration management unit 33 temporarily saves, in the RAM 12, "LPR port number" as a setting item of the data type 2 that is not a monitoring target.

It is assumed that in step S1324, the device configuration management unit 33 saves, in the data storage unit 34, the setting item of the data type 2 that is not a monitoring target and has been temporarily saved in the RAM in step S1803. Further, it is assumed that in step S1326, the device configuration management unit 33 deletes the setting item of the data type 2 that is not a monitoring target and has been temporarily saved in the RAM 12 in step S1803.

Further, in a case where it is determined in step S1802 that there is not a setting item of the data type 2 to which setting information of the data type 1 is applied (NO in step S1802), the processing immediately proceeds to step S1804.

In step S1804, the device configuration management unit 33 displays, in the task creation area 62, setting items and setting values other than those of the data type 1 among the setting items and the setting values of the device configuration file selected in step S1302, as monitoring item candidates and monitoring values in the "selection of device monitoring item" section in FIG. 8. That is, in a case where setting information of the data type 1 is set as a monitoring target in another system, a setting item corresponding to the setting information of the data type 1 is not set as a candidate for the selection of a setting item in step S1304. After the process of step S1804, the processing proceeds to step S1304.

Further, in a case where it is determined in step S1800 that the data configuration of the device configuration file selected in step S1302 is not the data configuration 1 or 2 (NO in step S1800), the processing proceeds to step S1805.

In step S1805, the device configuration management unit 33 determines whether the data configuration of the device configuration file selected in step S1302 is the data configuration 3 illustrated in FIG. 17.

Then, in a case where it is determined that the data configuration of the device configuration file selected in step S1302 is the data configuration 3 (YES in step S1805), the processing proceeds to step S1804.

In a case where, on the other hand, it is determined that the data configuration of the device configuration file selected in step S1302 is not the data configuration 3 (NO in step S1805), the processing proceeds to step S1806.

In step S1806, the device configuration management unit 33 determines whether the data configuration of the device configuration file selected in step S1302 is the data configuration 4 or 7 illustrated in FIG. 17.

Then, in a case where it is determined that the data configuration of the device configuration file selected in step S1302 is the data configuration 4 or 7 (YES in step S1806), the processing proceeds to step S1807.

In step S1807, the device configuration management unit 33 displays, in the task creation area 62, setting items and setting values of the data type 3 as monitoring item candidates and monitoring values in the "selection of device monitoring item" section in FIG. 8. After the process of step S1807, the processing proceeds to step S1304.

In a case where, on the other hand, it is determined that the data configuration of the device configuration file selected in step S1302 is not the data configuration 4 or 7 (NO in step S1806), the processing proceeds to step S1808.

In step S1808, the device configuration management unit 33 determines whether the data configuration of the device configuration file selected in step S1302 is the data configuration 5 illustrated in FIG. 17.

Then, in a case where it is determined that the data configuration of the device configuration file selected in step S1302 is not the data configuration 5 (NO in step S1808), the processing proceeds to step S1809.

In step S1809, the device configuration management unit 33 displays, in the task creation area 62, setting items and setting values of the data type 2 as monitoring item candidates and monitoring values in the "selection of device monitoring item" section in FIG. 8. After the process of step S1809, the processing proceeds to step S1304.

In a case where, on the other hand, it is determined that the data configuration of the device configuration file selected in step S1302 is the data configuration 5 (YES in step S1808), the processing proceeds to step S1810.

In step S1810, the device configuration management unit 33 displays, in the task creation area 62, a notification that there are no setting items and setting values that should be displayed as monitoring item candidates and monitoring values in the "selection of device monitoring item" section in FIG. 8, and the processing proceeds to step S1302.

The other processes are similar to those of FIG. 13 and therefore are not described here.

Figure 19B:
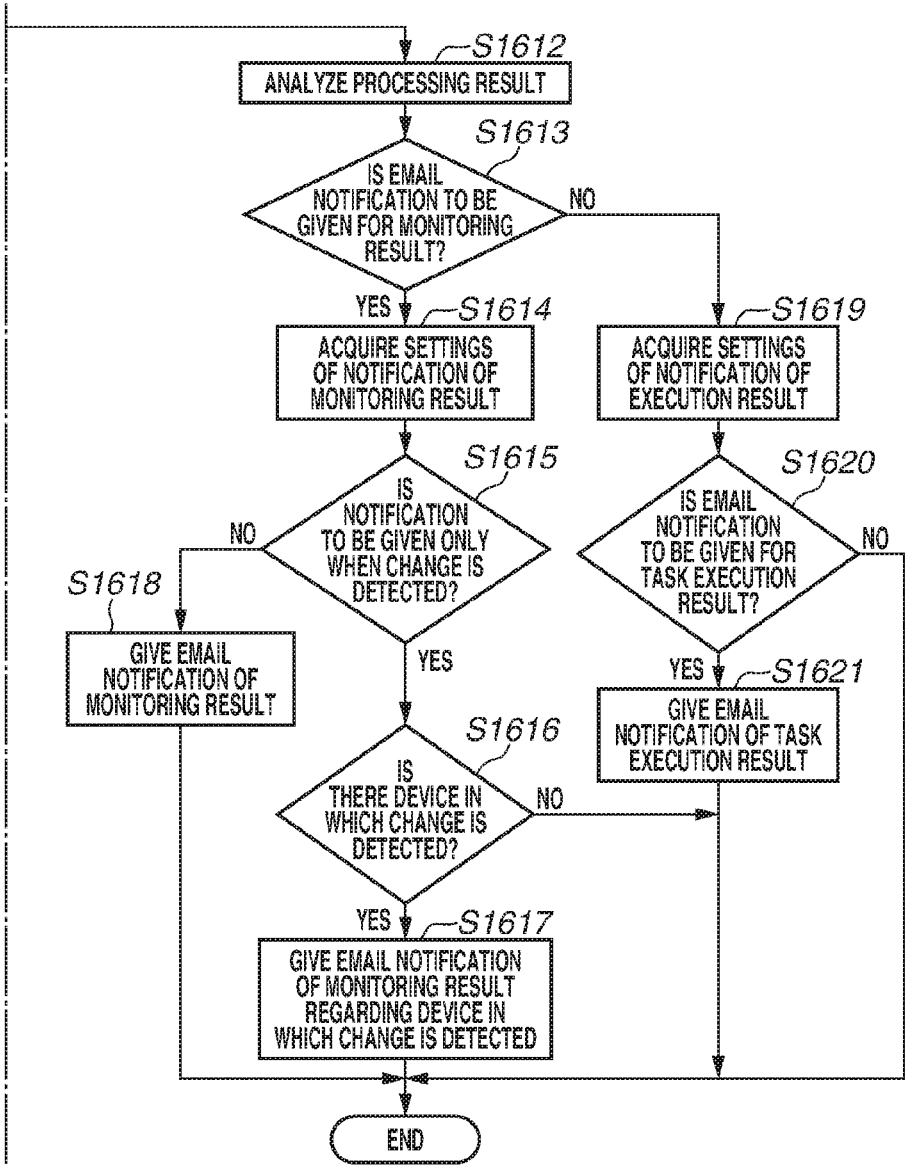
FIG. 19 (consisting of FIGS. 19A and 19B) is a flowchart illustrating an example of a monitoring task process according to the second exemplary embodiment.

Next, with reference to a flowchart in FIG. 19 (consisting of FIGS. 19A and 19B), a monitoring task process according to the second exemplary embodiment is described.

FIG. 19 is a flowchart illustrating an example of the monitoring task process according to the second exemplary embodiment. The processing of this flowchart is achieved in such a manner that the CPU 10 of the management server 1000 loads a program stored in the HDD 19 into the RAM 12 as necessary and executes the program. The flowchart in FIG. 19 is obtained by adding steps S1900 to S1903 to the flowchart in FIG. 16.

As a result of the comparison in step S1604, in a case where it is determined in step S1605 that there is a difference (YES in step S1605), the processing immediately proceeds to step S1900.

In step S1900, the device configuration management unit 33 acquires data type information of the data type supported by the monitoring target device 2000, and the processing proceeds to step S1901. An example of the data type information of the data type supported by the monitoring target device 2000 is illustrated in FIG. 4B.

FIG. 4B is a diagram illustrating an example of device information acquired by a device search performed by a device search unit 31 according to the second exemplary embodiment.

The device information as a result of a device search illustrated in FIG. 4B has a configuration obtained by adding a device type and a configuration data type to the configuration of the device information in FIG. 4A.

The device type is information indicating whether the detected device 2000 supports the data type 1. For example, the device DevA1 supports the data type 1, and the same applies to the devices DevA2 to DevAx. On the other hand, it is indicated that the devices DevB1 to DevBx does not support the data type 1.

Further, in FIG. 4B, it is indicated that for example, the configuration data types of the devices DevA1 to DevAx are the data types 1, 2, and 3, and the configuration data types of the devices DevB1 to DevBx are the data types 2 and 3.

The device configuration management unit 33 may acquire the data type information of the data type supported by the monitoring target device 2000 and the configuration data type from the device configuration service unit 36 of the device 2000 by a communication method, such as a web service. Further, the data type information may be provided as part of the monitoring target data of the monitoring target device 2000 acquired in step S1603.

In step S1901, the device configuration management unit 33 determines whether the monitoring target device 2000 supports the data type 1.

Then, in a case where it is determined that the monitoring target device 2000 supports the data type 1 (YES in step S1901), the processing proceeds to step S1902. In the above example, in a case where the monitoring target device 2000 is the devices DevA1 to DevAx, the device configuration management unit 33 determines that the monitoring target device 2000 supports the data type 1, and the processing proceeds to step S1902.

In step S1902, the device configuration management unit 33 acquires the setting item temporarily saved in the RAM 12 in step S1803 and saved in the data storage unit 34 in step S1324, as an item of the data type 2 that is not a monitoring target. In the above example, the device configuration management unit 33 acquires "LPR port number" as an item of the data type 2 that is not a monitoring target.

Next, in step S1903, the device configuration management unit 33 excludes the item of the data type 2 that is not a monitoring target and has been acquired in step S1902, from the monitoring item of the monitoring file in which there is a difference according to the determination in steps S1604 and S1605, and the processing proceeds to step S1606. In the above example, the device configuration management unit 33 excludes "LPR port number", and the processing proceeds to step S1606.

It is assumed that also regarding the item excluded in step S1903, the fact that there is a difference is saved in step S1611.

That is, in a case where it is determined that a value is different in setting information of the setting item of the data type 2 that is not a monitoring target, forced restoration is not performed, but an email notification is provided. In this case, even in a case where the determination in step S1620 is "NO", an email notification may be forcibly provided.

Further, in a case where it is determined in step S1901 that the monitoring target device 2000 does not support the data type 1 (NO in step S1901), the processing immediately proceeds to step S1606. In the above example, in a case where the monitoring target device 2000 is the devices DevB1 to DevBx, the device configuration management unit 33 determines that the monitoring target device 2000 does not support the data type 1, and the processing proceeds to step S1606.

Through the above processing, in the above example, the monitoring target items of the devices DevA1 to DevAx as monitoring target devices 2000 are as follows. Among the monitoring items selected in step S1304, "network/LPR port number" (9100) is excluded, and "timer/time for transition to auto sleep" (monitoring value: 10 minutes) is set as a monitoring item.

On the other hand, the monitoring target items of the devices DevB1 to DevBx as monitoring target devices 2000 are as follows. Among the monitoring items selected in step S1304, "timer/time for transition to auto sleep" (monitoring value: 10 minutes) and "network/LPR port number" (monitoring value: 9100) are set as monitoring items.

Thus, in addition to the effects of the first exemplary embodiment, it is also possible to, in a case where devices to be monitored include a device which supports a data configuration including a data type linked to a security item and for which the strengthening of security is regarded as important, easily monitor setting information of the device.

Based on the setting function of the device configuration management unit 33, there is a case where regarding a setting value of a device configuration file set for a device 2000, a rounding process (the process for correcting the setting value according to the device characteristics) occurs depending on the ability of the device 2000. In a third exemplary embodiment, a configuration capable of handling such a case is described.

FIG. 20 is a diagram illustrating an example of a rounding process device list holding a rounding process result according to the execution result of the setting function of the device configuration management unit 33. The rounding process device list is, for example, stored in the data storage unit 34 in a case where settings as illustrated in the line of "device configuration 1" in FIG. 6 are made.

As illustrated in FIG. 20, the rounding process device list includes a file name, a setting item 1, a setting item 2, a rounding process device name, and a rounding process result.

The file name, the setting item 1, and the setting item 2 are similar to those in FIG. 5.

The rounding process device name indicates the device name of a device in which a rounding process has occurred in a case where a device configuration file indicated by a file name has been applied.

The rounding process result indicates a rounded setting value (corrected setting information) of a device 2000 in which a rounding process has occurred.

In the example of FIG. 20, it is indicated that as illustrated in FIG. 6, in a case where the device configuration file of the device configuration 1 illustrated in FIG. 5 is set for the devices 2000, the setting value of "auto sleep" as one of the setting items 2 under "timer" as one of the setting items 1 is rounded from "10 minutes" to "15 minutes" for the devices DevB1 to DevBx. For example, this corresponds to a case where the setting value of "auto sleep" on a 15-minute basis is only permitted to set for the devices DevB1 to DevBx.

On the other hand, it is indicated that regarding "summer time" as another setting item 2 under "timer" as one of the setting items 1 and "LPR port number" and "SNMP port number" under "network" as the other of the setting items 1, a rounding process has not occurred for the devices 2000.

In a case where a rounding process has been performed as illustrated in FIG. 20, and when device configuration information is monitored using the device configuration 1 in which the setting value of "time for transition to auto sleep" under "timer" is 10 minutes, it is always determined that the setting value is changed for the devices DevB1 to DevBx. Thus, in such a case, it is desirable that device configuration information of a device 2000 in which a rounding process occurs should be monitored using, as a monitoring value, not a monitoring value of a device 2000 in which a rounding process does not occur, but a value rounded by a rounding process. That is, it is desirable that in a case where "time for transition to auto sleep" under "timer" is monitored using the device configuration file of the device configuration 1, the devices DevA1 to DevAx should be monitored using 10 minutes, which is a monitoring value. On the other hand, it is desirable that the devices DevB1 to DevBx should be monitored using 15 minutes, which is a rounded value. An exemplary embodiment for achieving this configuration is described below.

Figure 21:
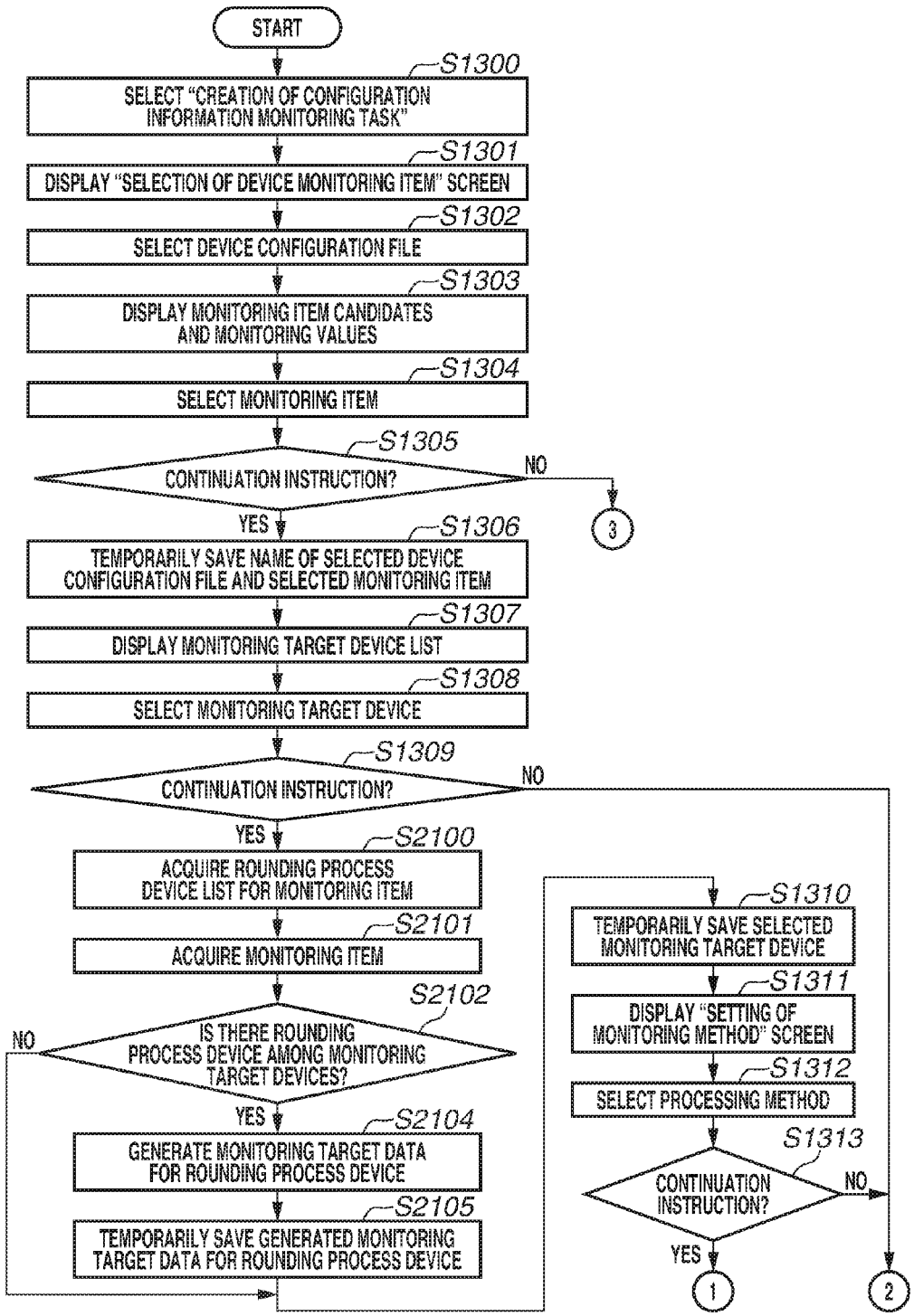
FIG. 21 is a flowchart illustrating an example of a configuration information monitoring task creation process according to the third exemplary embodiment.

FIG. 21 is a flowchart illustrating an example of a configuration information monitoring task creation process performed by a device configuration management unit according to a third exemplary embodiment. The processing of this flowchart is achieved in such a manner that the CPU 10 of the management server 1000 loads a program stored in the HDD 19 into the RAM 12 as necessary and executes the program. The flowchart in FIG. 21 is obtained by adding steps S2100 to S2105 to the flowchart in FIG. 13.

In a case where it is determined in step S1309 that a continuation instruction is provided (YES in step S1309), the processing proceeds to step S2100.

In step S2100, the device configuration management unit 33 acquires, from the data storage unit 34, a rounding process device list, which is the result of settings for the devices 2000 using the device configuration file selected in step S1302. A description is given below on the assumption that the device configuration management unit 33 acquires the rounding process device list illustrated in FIG. 20, which is the result of setting the device configuration 1 to the devices 2000.

Next, in step S2101, the device configuration management unit 33 acquires the monitoring item selected in step S1304. In the above example, the device configuration management unit 33 acquires "timer/time for transition to auto sleep" (monitoring value: 10 minutes) and "network/LPR port number" (monitoring value: 9100) as monitoring items.

Next, in step S2102, the device configuration management unit 33 determines whether among the monitoring target devices 2000 selected in step S1308, there is a device 2000 in which a rounding process occurs regarding the monitoring item selected in step S1304. Then, in a case where it is determined that there is not a device 2000 for which a rounding process occurs (NO in step S2102), the processing immediately proceeds to step S1310.

In a case where, on the other hand, it is determined that there is a device 2000 in which a rounding process occurs (YES in step S2102), the processing proceeds to step S2104. In the above example, the device configuration management unit 33 determines that a rounding process occurs in the devices DevB1 to DevBx among the monitoring target devices DevA1 to DevAx and DevB1 to DevBx, regarding "timer/time for transition to auto sleep" (monitoring value: 10 minutes) as a monitoring item.

In step S2104, the device configuration management unit 33 generates monitoring target data for the device 2000 in which a rounding process occurs according to the determination in step S2102. In the above example, the device configuration management unit 33 generates monitoring target data in which the monitoring value of "timer/time for transition to auto sleep" for the devices DevB1 to DevBx is 15 minutes.

Next, in step S2105, the device configuration management unit 33 temporarily saves, in the RAM 12, the monitoring target data generated in step S2104 for the device 2000 in which a rounding process occurs, and the processing proceeds to step S1310. In the above example, the device configuration management unit 33 temporarily saves, in the RAM 12, the monitoring target data in which the monitoring value of "timer/time for transition to auto sleep" for the devices DevB1 to DevBx is 15 minutes.

When the device configuration management unit 33 deletes the data temporarily saved in the RAM 12 in step S1326, the device configuration management unit 33 deletes also the monitoring target data temporarily saved in step S2105 for the device 2000 in which a rounding process is occurs. Further, when the device configuration management unit 33 saves the monitoring file in the device configuration data storage unit 35 in step S1325, the device configuration management unit 33 generates and saves a rounding process monitoring file including the monitoring target data temporarily saved in the RAM 12 in step S2105 for the device 2000 in which a rounding process occurs. This means that the device configuration management unit 33 generates a monitoring file for a device 2000 in which a rounding process does not occur and a monitoring file for a device 2000 in which a rounding process occurs, and saves the monitoring files in the device configuration data storage unit 35.

Figure 22B:
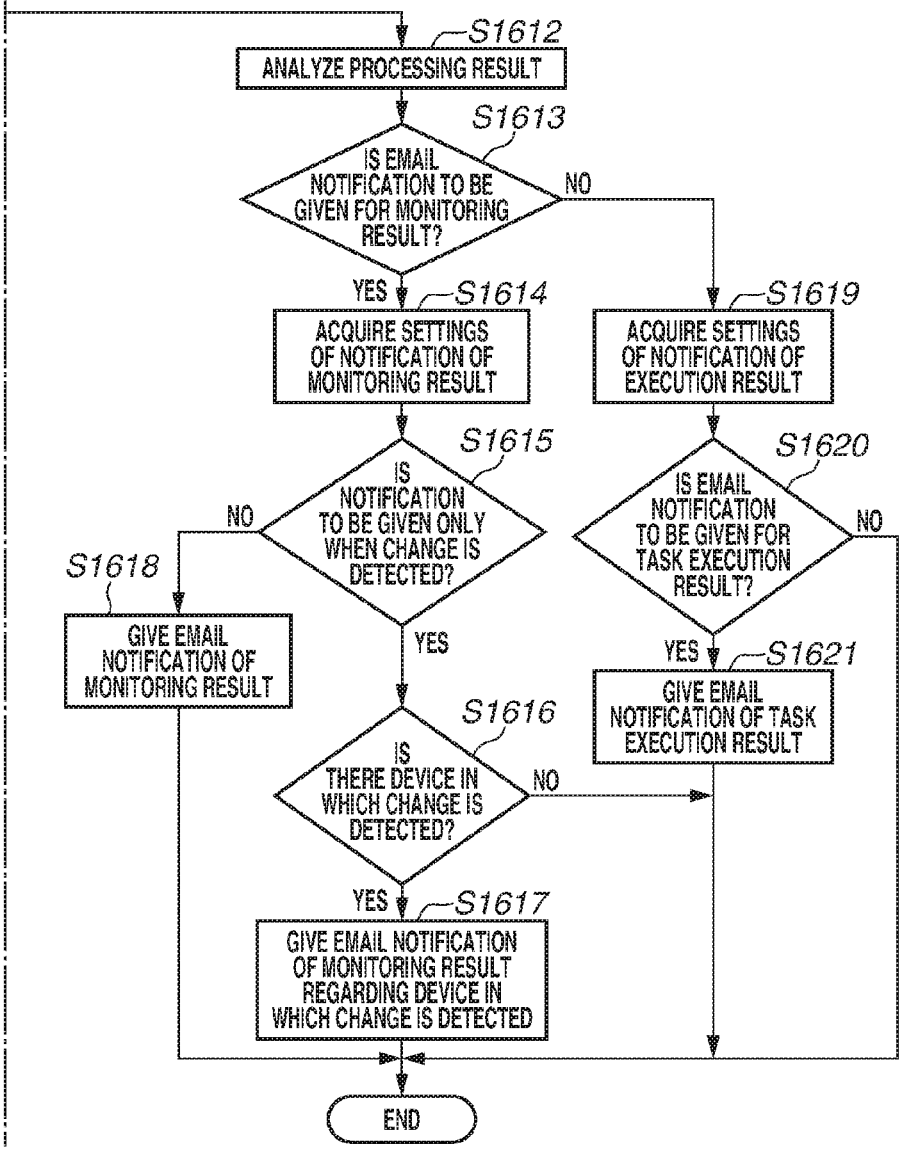
FIG. 22 (consisting of FIGS. 22A and 22B) is a flowchart illustrating an example of a monitoring task process according to the third exemplary embodiment.

FIG. 22 (consisting of FIGS. 22A and 22B) is a flowchart illustrating an example of a monitoring task process according to the third exemplary embodiment. The processing of this flowchart is achieved in such a manner that the CPU 10 of the management server 1000 loads a program stored in the HDD 19 into the RAM 12 as necessary and executes the program. The flowchart in FIG. 22 is obtained by adding steps S2200 to S2203 to the flowchart in FIG. 16.

After the process of step S1601, the processing proceeds to step S2200. In step S2200, the device configuration management unit 33 acquires a rounding process device list from the data storage unit 34. In the above example, the device configuration management unit 33 acquires the rounding process device list in FIG. 20. Then, after step S1602, in a case where the monitoring of the monitoring target devices 2000 is not completed, the processing proceeds to step S2201.

In step S2201, based on the rounding process device list acquired in step S2200, the device configuration management unit 33 determines whether the monitoring target device 2000 is a device 2000 in which a rounding process occurs. Then, in a case where it is determined that the monitoring target device 2000 is not a device 2000 in which a rounding process occurs (NO in step S2201), the processing proceeds to step S1603. In the above example, in a case where the monitoring target device 2000 is the monitoring target devices DevA1 to DevAx, the processing proceeds to step S1603.

In a case where, on the other hand, it is determined that the monitoring target device 2000 is a device 2000 in which a rounding process occurs (YES in step S2201), the processing proceeds to step S2202. In the above example, in a case where the monitoring target device 2000 is the devices DevB1 to DevBx, the processing proceeds to step S2202.

In step S2202, the device configuration management unit 33 acquires the rounding process device monitoring file saved in the device configuration data storage unit 35 in step S1325. In the above example, the device configuration management unit 33 acquires a monitoring target device configuration file in which the monitoring value of "timer/time for transition to auto sleep" is 15 minutes for the monitoring target devices DevB1 to DevBx.

Next, in step S2203, the device configuration management unit 33 acquires, from the device configuration service unit 36 of the monitoring target device 2000, a device information configuration file of the monitoring target device 2000 corresponding to the rounding process device monitoring file acquired in step S2202. In the above example, the device configuration management unit 33 acquires a monitoring target file including "timer/time for transition to auto sleep" and "network/LPR port number" from the device configuration service unit 36 of each of the monitoring target devices DevB1 to DevBx. After the process of step S2203, the processing proceeds to step S1604.

Based on the above processing, in addition to the effects of the first exemplary embodiment, it is also possible to, in a case where devices to be monitored include a device for which a rounding process is required, easily monitor setting information of the device.

As illustrated in the third exemplary embodiment, based on the setting function of the device configuration management unit 33, there is a case where regarding a setting value of a device configuration file set for a device 2000, a rounding process occurs depending on the ability of the device 2000. In such a case, it is desirable that the device configuration management unit 33 should set only devices 2000 according to a selected monitoring item, as devices 2000 to be displayed in the "selection of monitoring target device" section of the "selection of monitoring target device" screen of the "creation of configuration information monitoring task" menu. An exemplary embodiment for achieving such a configuration is described below.

Figure 23:
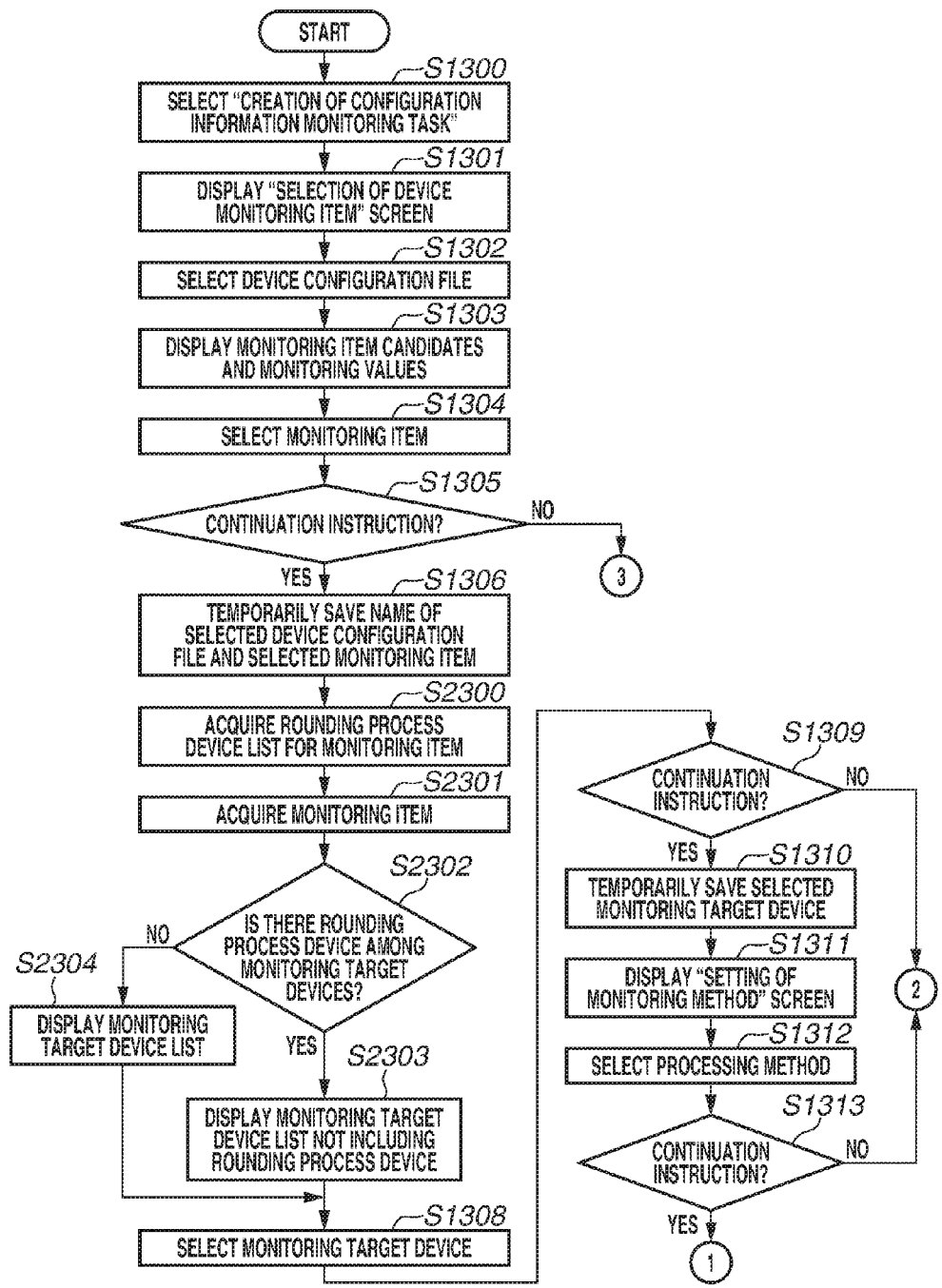
FIG. 23 is a flowchart illustrating an example of a configuration information monitoring task creation process according to a fourth exemplary embodiment.

FIG. 23 is a flowchart illustrating an example of a configuration information monitoring task creation process performed by the device configuration management unit 33 according to a fourth exemplary embodiment. The processing of this flowchart is achieved in such a manner that the CPU 10 of the management server 1000 loads a program stored in the HDD 19 into the RAM 12 as necessary and executes the program. The flowchart in FIG. 23 is obtained by adding steps S2300 to S2304 to the flowchart in FIG. 13.

In step S1306, the device configuration management unit 33 temporarily saves, in the RAM 12, the name of the device configuration file selected in step S1302 and the monitoring item selected in step S1304, and the processing proceeds to step S2300.

In step S2300, the device configuration management unit 33 acquires, from the data storage unit 34, a rounding process device list, which is the result of settings for the devices 2000 using the device configuration file selected in step S1302. In the above example, the device configuration management unit 33 acquires the rounding process device list illustrated in FIG. 20, which is the result of setting the device configuration 1 illustrated in FIG. 6 to the devices 2000.

Next, in step S2301, the device configuration management unit 33 acquires the monitoring item selected in step S1304. In the above example, the device configuration management unit 33 acquires "timer/time for transition to auto sleep" (monitoring value: 10 minutes) and "network/LPR port number" (monitoring value: 9100) as monitoring items.

Next, in step S2302, the device configuration management unit 33 acquires a device list as illustrated in FIG. 4A and determines whether in the device list, there is a device 2000 in which a rounding process occurs regarding the monitoring item selected in step S1304. Then, in a case where it is determined that there is a device 2000 in which a rounding process occurs (YES in step S2302), the processing proceeds to step S2303. In the above example, the device configuration management unit 33 determines that a rounding process occurs in the devices DevB1 to DevBx among the monitoring target devices DevA1 to DevAx and DevB1 to DevBx, regarding "timer/time for transition to auto sleep" (monitoring value: 10 minutes) as a monitoring item.

In step S2303, the device configuration management unit 33 displays, in the "selection of monitoring target device" section in FIG. 9, devices 2000 not including the device 2000 in which a rounding process occurs according to the determination in step S2302, among all the devices 2000 included in the device list acquired in step S2302. In the above example, the device configuration management unit 33 displays, in the "selection of monitoring target device" section in FIG. 9, the devices DevA1 to DevAx, excluding the devices DevB1 to DevBx in which a rounding process occurs. After the process of step S2303, the processing proceeds to step S1308.

In a case where, on the other hand, it is determined in step S2302 that there is not a device 2000 in which a rounding process occurs (NO in step S2302), the processing proceeds to step S2304.

In step S2304, the device configuration management unit 33 displays, in the "selection of monitoring target device" section in FIG. 9, all the devices 2000 included in the device list acquired in step S2302. After the process of step S2304, the processing proceeds to step S1308.

Consequently, it is possible to exclude a device included in a rounding process device list from a candidate for a target to be monitored in a monitoring task to be generated (that is, it is possible to exclude a device included in a rounding process device list from a target to be monitored in a monitoring task to be generated).

Based on the above processing, in addition to the effects of the first exemplary embodiment, it is also possible to, in a case where a device management system includes a device in which a rounding process is required, easily monitor setting information of the device.

As illustrated above, each of the exemplary embodiments of the present invention has the following configuration. The management server 1000 receives the selection of a monitoring item and a monitoring target device from an IT administrator, creates a monitoring task for monitoring the monitoring item of the monitoring target device, and saves monitoring data including the monitoring item and a setting value corresponding to the monitoring task in such a manner that the monitoring data is associated with the monitoring task. Then, when the monitoring task is executed, the management server 1000 acquires, from the monitoring target device, a device configuration file corresponding to the monitoring data and including the monitoring item, and compares the acquired device configuration file of the monitoring target device with the monitoring data. In a case where there is a difference between the device configuration file and the monitoring data, processing according to a processing method set in the monitoring task is performed. Based on such a configuration, even in a large-scale device management system, it is possible to achieve an improvement in the operability of a monitoring procedure for configuration information of a device 2000 and appropriate remote monitoring according to device characteristics, and reduce the management cost, of an IT administrator, relating to a computer system.

That is, it is possible to reduce the trouble of and the management cost of an IT administrator when monitoring a setting value group including a setting value corresponding to a secure policy, and restoring a changed setting of the setting value, using a task in which a schedule and a monitoring target can be set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-025990, filed Feb. 13, 2015, and No. 2015-035080, filed Feb. 25, 2015, which are hereby incorporated by reference herein in their entirety.

What is claimed is:

1. A monitoring apparatus comprising:
a selection unit configured to select, in a case where a monitoring task for monitoring setting information set for a network device is generated, a setting content to be a monitoring target from setting information that can be set for the network device;
a saving unit configured to extract, as monitoring data, in a case where setting information of a specific type is selected as the setting content, setting information corresponding to the setting content along with generation of a monitoring task in which a network device as a target to be monitored, a monitoring setting, and a monitoring schedule are set, and save the monitoring data in such a manner that the monitoring data is associated with the generated monitoring task;
a control unit configured to control execution of the generated monitoring task according to the monitoring schedule set in the monitoring task;
an acquisition unit configured to acquire, in a case where the monitoring task is executed, setting information corresponding to the monitoring data from the network device set in the monitoring task; and
an execution unit configured to execute, according to a result of a comparison process using the setting information acquired by the acquisition unit, processing according to the monitoring setting set in the executed monitoring task,
wherein in a case where setting information of a type different from the specific type is selected as the setting content, the saving unit does not save monitoring data along with generation of a monitoring task in which a network device as a target to be monitored, a monitoring setting, and a monitoring schedule are set.

2. The monitoring apparatus according to claim 1, wherein the setting information of the type different from the specific type is setting information corresponding to a policy of security,
wherein, for case of the setting information corresponding to the policy of security, in a case where a setting content to be a monitoring target is selected, the selection unit selects any of policy versions managed by the monitoring apparatus, and
wherein in a case where a monitoring task in which the policy version is selected is executed, a comparison process for comparing the setting information acquired by the acquisition unit with setting information corresponding to the selected version is performed.

3. The monitoring apparatus according to claim 1, wherein the monitoring setting includes at least either of a first monitoring setting for providing an email notification that a setting of the network device as a target to be monitored is changed, and a second monitoring setting for updating a setting of the network device as a target to be monitored, using a value included in the monitoring data.

4. The monitoring apparatus according to claim 3, wherein in a case where the first monitoring setting has been set in the executed monitoring task, the execution unit executes processing for providing a notification using an email to which a file having details of a detection result of all network devices in which changes in settings are detected is attached.

5. The monitoring apparatus according to claim 3, wherein in a case where the second monitoring setting has been set in the executed monitoring task, the execution unit instructs the network device as a target to be monitored set in the monitoring task, to update a value of a setting item that is not the same according to a determination by the determination unit, using a value included in the monitoring data.

6. The monitoring apparatus according to claim 1, wherein the network device is any of an image forming apparatus, a network camera, a digital medical device, a robot, an in-car terminal, and an air-conditioning device.

7. A control method for a monitoring apparatus, the control method comprising:
   selecting, in a case where a monitoring task for monitoring setting information set for a network device is generated, a setting content to be a monitoring target from setting information that can be set for the network device;
   extracting, as monitoring data, in a case where setting information of a specific type is selected as the setting content, setting information corresponding to the setting content along with generation of a monitoring task in which a network device as a target to be monitored, a monitoring setting, and a monitoring schedule are set, and saving the monitoring data in such a manner that the monitoring data is associated with the generated monitoring task;
   controlling execution of the generated monitoring task according to the monitoring schedule set in the monitoring task;
   acquiring, in a case where the monitoring task is executed, setting information corresponding to the monitoring data from the network device set in the monitoring task; and
   executing, according to a result of a comparison process using the acquired setting information, processing according to the monitoring setting set in the executed monitoring task,
   wherein in a case where setting information of a type different from the specific type is selected as the setting content, monitoring data is not saved along with generation of a monitoring task in which a network device as a target to be monitored, a monitoring setting, and a monitoring schedule are set.

8. A computer readable storage medium on which is stored a computer program for making a computer execute a method for a monitoring apparatus, the method comprising:
   selecting, in a case where a monitoring task for monitoring setting information set for a network device is generated, a setting content to be a monitoring target from setting information that can be set for the network device;
   extracting, as monitoring data, in a case where setting information of a specific type is selected as the setting content, setting information corresponding to the setting content along with generation of a monitoring task in which a network device as a target to be monitored, a monitoring setting, and a monitoring schedule are set, and saving the monitoring data in such a manner that the monitoring data is associated with the generated monitoring task;
   controlling execution of the generated monitoring task according to the monitoring schedule set in the monitoring task;
   acquiring, in a case where the monitoring task is executed, setting information corresponding to the monitoring data from the network device set in the monitoring task; and
   executing, according to a result of a comparison process using the acquired setting information, processing according to the monitoring setting set in the executed monitoring task,
   wherein in a case where setting information of a type different from the specific type is selected as the setting content, monitoring data is not saved along with generation of a monitoring task in which a network device as a target to be monitored, a monitoring setting, and a monitoring schedule are set.

* * * * *